US 9,305,406 B2

(12) United States Patent
Divelbiss et al.

(10) Patent No.: US 9,305,406 B2
(45) Date of Patent: Apr. 5, 2016

(54) ASSET MONITORING AND FUELING SYSTEM

(75) Inventors: Donald S. Divelbiss, Howard, OH (US); Terry L. Divelbiss, Fredericktown, OH (US); Erin Bechtel, Fredericktown, OH (US); Shawn M. Reynolds, Lucas, OH (US); William Barth Burgett, Fredericktown, OH (US); Brian T. Gott, Bellville, OH (US); Rodney L. Pew, Danville, OH (US); Timothy E. Truex, Butler, OH (US)

(73) Assignee: Divelbiss Corporation and Kokosing Construction Co., Inc., Fredericktown, OH (US)

( * ) Notice: Subject to any disclaimer, the term of this patent is extended or adjusted under 35 U.S.C. 154(b) by 606 days.

(21) Appl. No.: 13/562,643

(22) Filed: Jul. 31, 2012

(65) Prior Publication Data

US 2013/0035788 A1    Feb. 7, 2013

Related U.S. Application Data

(60) Provisional application No. 61/513,860, filed on Aug. 1, 2011.

(51) Int. Cl.
*G08B 5/22* (2006.01)
*G07C 5/00* (2006.01)
*B67D 7/04* (2010.01)
*B67D 7/14* (2010.01)
*B67D 7/32* (2010.01)

(52) U.S. Cl.
CPC *G07C 5/008* (2013.01); *B67D 7/04* (2013.01); *B67D 7/14* (2013.01); *B67D 7/145* (2013.01); *B67D 7/32* (2013.01); *G07C 5/004* (2013.01)

(58) Field of Classification Search
CPC ............ B67D 7/04; B67D 7/14; B67D 7/145; B67D 7/32; G07C 5/004; G07C 5/008
USPC ......................................... 340/8.1
See application file for complete search history.

(56) References Cited

U.S. PATENT DOCUMENTS

| | | |
|---|---|---|
| 5,250,761 A | 10/1993 | Koyanagi |
| 5,289,372 A | 2/1994 | Guthrie et al. |
| 5,374,917 A | 12/1994 | Hoffman et al. |
| 5,448,479 A | 9/1995 | Kemner et al. |
| 5,469,356 A | 11/1995 | Hawkins et al. |
| 5,586,030 A | 12/1996 | Kemner et al. |
| 5,596,513 A | 1/1997 | Schricker |
| 5,664,113 A | 9/1997 | Worger et al. |
| 5,742,915 A | 4/1998 | Stafford |
| 5,848,368 A | 12/1998 | Allen et al. |

(Continued)

*Primary Examiner* — Omer S Khan
(74) *Attorney, Agent, or Firm* — Calfee, Halter & Griswold LLP

(57) ABSTRACT

The present application discloses systems and methods for managing assets. In one exemplary embodiment, a system for monitoring an asset is disclosed. The system comprises at least one asset monitoring device, at least one fuel control device, and a central server. The asset monitoring device is configured for use with the asset to collect asset data about the asset. The fuel control device is configured for use with a fuel source to collect fueling data about fueling of the asset. The fuel control device is configured to communicate with the asset monitoring device to receive the asset data from the asset monitoring device. The central server is configured to communicate with the fuel control device to receive the asset data and the fueling data from the fuel control device.

42 Claims, 16 Drawing Sheets

(56) References Cited

U.S. PATENT DOCUMENTS

| | | | |
|---|---|---|---|
| 5,906,655 A | 5/1999 | Fan | |
| 6,067,044 A | 5/2000 | Whelan et al. | |
| 6,263,265 B1 | 7/2001 | Fera | |
| 6,292,108 B1 | 9/2001 | Straser et al. | |
| 6,301,531 B1 | 10/2001 | Pierro et al. | |
| 6,385,494 B1 | 5/2002 | Blahnik et al. | |
| 6,469,638 B1 | 10/2002 | Johnson | |
| 6,608,554 B2 | 8/2003 | Lesesky et al. | |
| 6,611,755 B1 | 8/2003 | Coffee et al. | |
| 6,615,186 B1 | 9/2003 | Kolls | |
| 6,628,992 B2 | 9/2003 | Osburn, III | |
| 6,648,032 B1 | 11/2003 | Kelrich et al. | |
| 6,651,001 B2 | 11/2003 | Apsell | |
| 6,654,673 B2 | 11/2003 | Ferguson et al. | |
| 6,741,921 B2 | 5/2004 | Cohen et al. | |
| 6,778,893 B2 | 8/2004 | Murakami et al. | |
| 6,795,017 B1 | 9/2004 | Puranik et al. | |
| 6,934,298 B2 | 8/2005 | Bentley | |
| 6,954,689 B2 | 10/2005 | Hanson et al. | |
| 6,980,124 B2 | 12/2005 | Kong et al. | |
| 7,034,710 B2 | 4/2006 | Falada et al. | |
| 7,048,185 B2 | 5/2006 | Hart | |
| 7,064,651 B2 | 6/2006 | Goetz | |
| 7,119,696 B2 | 10/2006 | Borugian | |
| 7,230,544 B2 | 6/2007 | Van Heteren | |
| 7,295,098 B2 | 11/2007 | Betts, Jr. et al. | |
| 7,299,099 B1 | 11/2007 | Divelbiss et al. | |
| 7,304,588 B2 | 12/2007 | Ingalsbe et al. | |
| 7,471,199 B2 | 12/2008 | Zimmerman et al. | |
| 8,004,397 B2 | 8/2011 | Forrest et al. | |
| 2002/0065698 A1* | 5/2002 | Schick et al. | 705/8 |
| 2004/0056771 A1 | 3/2004 | Dungan | |
| 2004/0073468 A1 | 4/2004 | Vyas et al. | |
| 2004/0075541 A1 | 4/2004 | Simoneau | |
| 2005/0102074 A1 | 5/2005 | Kolls | |
| 2005/0103253 A1* | 5/2005 | Harris | 114/343 |
| 2005/0151629 A1 | 7/2005 | Simoneau | |
| 2005/0179537 A1 | 8/2005 | Lewis | |
| 2005/0242921 A1 | 11/2005 | Zimmerman et al. | |
| 2005/0272375 A1* | 12/2005 | Ramesh | H04B 17/318 455/67.11 |
| 2006/0850106 | 10/2006 | Ballew et al. | |
| 2007/0801091 | 5/2007 | Forrest et al. | |
| 2007/0203670 A1 | 8/2007 | Earle | |
| 2007/0252734 A1 | 11/2007 | Greiner et al. | |
| 2007/0290791 A1 | 12/2007 | Batra | |
| 2008/0084324 A1 | 4/2008 | Wallace et al. | |
| 2008/0084332 A1 | 4/2008 | Ritter et al. | |
| 2008/0084333 A1 | 4/2008 | Forrest et al. | |
| 2008/0084334 A1 | 4/2008 | Ballew | |
| 2008/0086320 A1 | 4/2008 | Ballew et al. | |
| 2008/0086321 A1 | 4/2008 | Walton | |
| 2008/0086322 A1 | 4/2008 | Wallace | |
| 2008/0086323 A1 | 4/2008 | Petrie et al. | |
| 2008/0086349 A1 | 4/2008 | Petrie | |
| 2008/0086391 A1 | 4/2008 | Maynard et al. | |
| 2008/0086427 A1 | 4/2008 | Wallace | |
| 2008/0086428 A1 | 4/2008 | Wallace | |
| 2008/0086497 A1 | 4/2008 | Wallace et al. | |
| 2008/0086508 A1 | 4/2008 | Ballew | |
| 2008/0086509 A1 | 4/2008 | Wallace | |
| 2008/0086685 A1 | 4/2008 | Janky et al. | |
| 2008/0132185 A1 | 6/2008 | Elliott et al. | |
| 2008/0295586 A1* | 12/2008 | Fosseen | 73/114.14 |
| 2009/0045290 A1* | 2/2009 | Small | B64C 39/024 244/135 A |
| 2009/0096599 A1 | 4/2009 | Kranz | |
| 2009/0096637 A1 | 4/2009 | Olson et al. | |
| 2011/0137470 A1* | 6/2011 | Surnilla et al. | 700/282 |
| 2011/0201378 A1* | 8/2011 | Lee et al. | 455/522 |
| 2012/0095920 A1* | 4/2012 | McQuade et al. | 705/50 |

* cited by examiner

ASSET MONITORING AND FUELING SYSTEM

CROSS REFERENCE TO RELATED APPLICATION

This application is a U.S. Non-Provisional Application which claims priority to U.S. Provisional Patent Application No. 61/513,860, filed on Aug. 1, 2011 and titled "Asset Monitoring and Fueling System," which is hereby incorporated by reference in its entirety.

BACKGROUND

Large construction projects often require a variety of construction assets that perform various tasks. Some construction projects are spread over a large area and involve many different assets, most of which require fuel to operate. Due in part to the large area and remote locations of many of the assets, managing the productivity, maintenance, fueling, and security of the assets is often difficult.

SUMMARY

The present application discloses systems and methods for managing assets. In one exemplary embodiment, a system for monitoring an asset is disclosed. The system comprises at least one asset monitoring device, at least one fuel control device, and a central server. The asset monitoring device is configured for use with the asset to collect asset data about the asset. The fuel control device is configured for use with a fuel source to collect fueling data about fueling of the asset. The fuel control device is configured to communicate with the asset monitoring device to receive the asset data from the asset monitoring device. The central server is configured to communicate with the fuel control device to receive the asset data and the fueling data from the fuel control device.

In another exemplary embodiment, a fuel indication method for an asset is disclosed. The method comprises using an asset monitoring device connected to an asset to determine whether a fuel source is within a specified range of the asset. The asset monitoring device determines whether the asset has been run for more than a predetermined length of time since the asset was last fueled. The asset monitoring device notifies the fuel source that the asset does not require fuel.

In another exemplary embodiment, a method of fueling an asset is disclosed. The method comprises using a fuel control device connected to a fuel source to determine whether a user is authorized to operate the fuel source. The fuel control device determines the identity of an asset to be fueled using the fuel source and restricts the amount and type of fuel delivered to the asset. The asset is fueled using the fuel source and the fuel control device logs fueling data about fueling the asset.

In another exemplary embodiment, a method of authorizing use of an asset is disclosed. The method comprises using an asset monitoring device connected to an asset to determine whether a user is authorized to operate the asset. A human machine interface connected to the asset monitoring device is used to collect identification data about the user. The asset monitoring device compares the identification data against a list of authorized users to determine whether the user is authorized to operate the asset. The asset monitoring device enables the asset's ignition if the user is authorized to operate the asset. The asset monitoring device may also be used to determine whether an inspection of the asset was completed and to enable the asset's ignition if the inspection was completed.

In another exemplary embodiment, a method of using an asset is disclosed. The method comprises using an asset monitoring device connected to an asset to collect asset data about the asset. The asset monitoring device compares the asset data against shut down data managed on a central server and transmitted to the asset monitoring device to determine a length of time the asset is permitted to idle after an ignition of the asset is turned off. The asset is permitted to idle for the length of time after the ignition is turned off.

These and additional embodiments will become apparent in the course of the following detailed description.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of the inventions.

DESCRIPTION OF EMBODIMENTS

Figure 1:
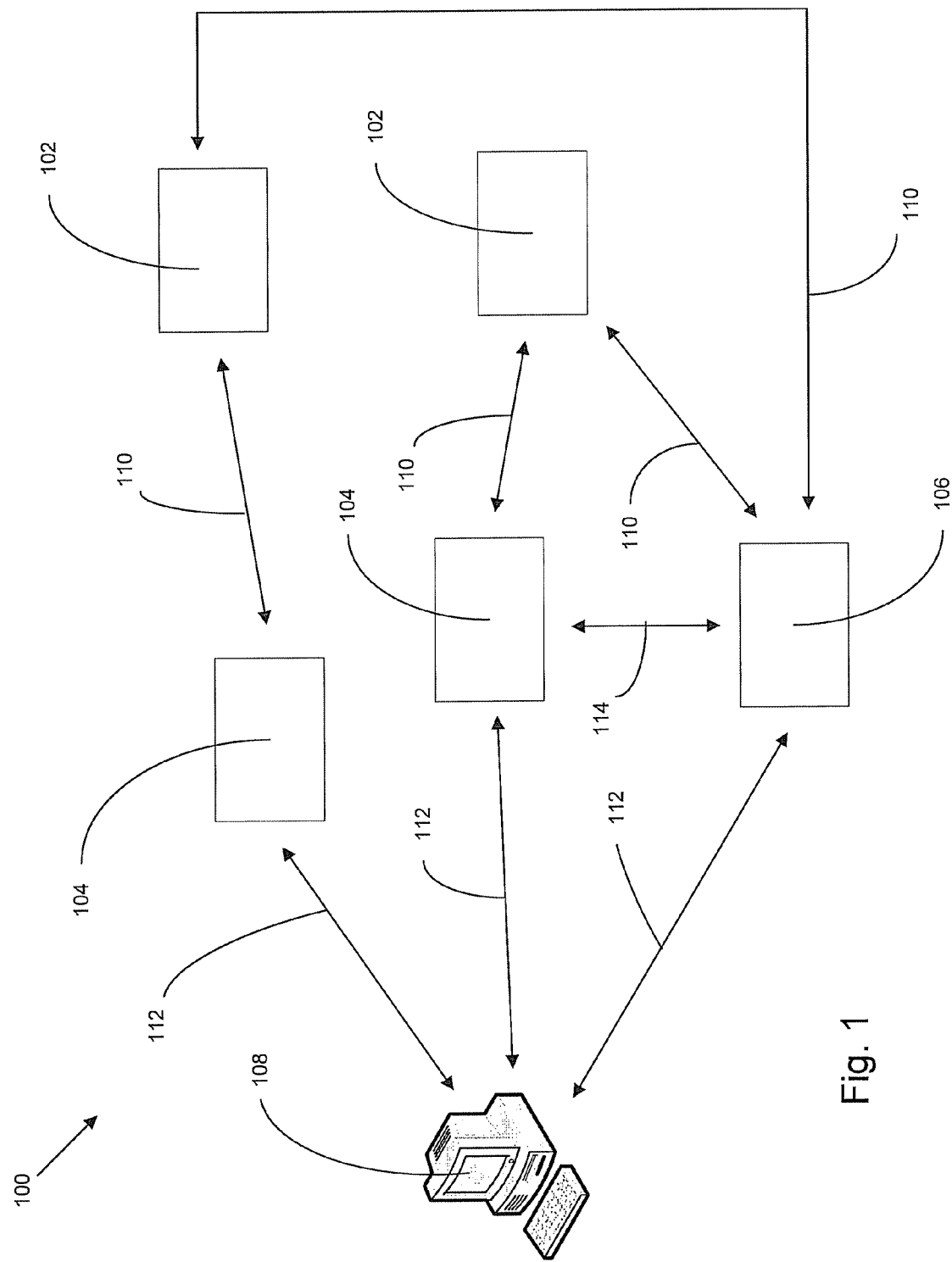
FIG. 1 illustrates a system according to an embodiment of the present application.

The following includes definitions of exemplary terms used throughout the disclosure and specification. Both singular and plural forms of all terms fall within each meaning:

"Asset", as used herein, may include any type of motorized or non-motorized asset, such as, for example, a vehicle, a piece of equipment, a fuel tank or container, etc. An asset may be used above or below the surface or underwater. The system of the present application may be configured for use with construction assets (e.g., assets used in construction, paving, excavation, erection, dredging, material handling, etc.). These construction assets may include, for example, trucks, tractors, backhoes, bulldozers, excavators, cranes, drilling machines, fuel trucks, shovels, loaders, scrapers, graders, compactors, conveyors, fuel tanks, fuel containers, or any other type of asset generally used during construction, paving, excavation, erection, dredging, material handling, etc. However, the system of the present application may be configured for use with other types of motorized or non-motorized assets, including fleets of equipment, vehicles or trucks.

"Fuel source", as used herein, may include any portable or non-portable fuel source, such as a fuel truck, fuel station, fuel tank, or fuel container. A fuel source may be used for any type of fuel or fuel mixture, including, for example, gasoline, diesel, biodiesel, bioalcohol (methanol, ethanol, butanol), liquid natural gas, compressed natural gas, liquid petroleum gas, propane, hydrogen, methane, hythane, butane, vegetable oil, biomass, ammonia, liquid nitrogen, compressed air, or other fuels and mixtures thereof. Further, "fueling" an asset may include, for example, filling or refilling a tank, canister, container, fuel cell, etc. of an asset with fuel or charging one or more batteries of an asset.

"Logic", as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software. "Software", as used herein, includes but is not limited to one or more computer readable and/or executable instructions that cause a computer or other electronic device to perform functions, actions, and/or behave in a desired manner. The instructions may be embodied in various forms such as routines, algorithms, modules, or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software may be dependent on, for example, requirements of a desired application, the environment it runs on, and/or the desires of a designer/programmer or the like.

"Signal", as used herein, includes, but is not limited to one or more electrical signals, analog or digital signals, optical or light (electro-magnetic) signals, one or more computer instructions, a bit or bit stream, or the like.

"Wireless communication", as used herein, means any type of wireless communication, including through a Wi-Fi, cellular, or radio communication.

The system of the present application facilitates management of the productivity, maintenance, fueling, and security of assets, such as a fleet of assets. For example, the system provides for remote monitoring of an asset's usage, productivity, and fueling. The system also prohibits unauthorized use and fueling of an asset. Further, the system of the present application facilitates fueling, maintenance, proper operation, and efficient use of the asset. The system may also be configured to generate reports related to an asset's productivity, maintenance, fueling, and security.

FIG. 1 illustrates a system 100 according to an embodiment of the present application. The system 100 includes one or more asset monitoring device ("AMD") 102, one or more fuel control device ("FCD") 104, and one or more data collection device ("DCD") 106. The AMD 102 is configured for use with an asset to collect and generate information about the asset ("asset data") and facilitate usage and maintenance of the asset. The FCD 104 is configured for use with a fuel source to collect and generate information regarding the fueling of an asset ("fueling data") and facilitate fueling of the asset.

The DCD 106 of the system 100 is generally configured for use with a data collection asset to receive and transmit the asset data from the AMD. A data collection asset may include, for example, any asset involved in a productivity role of the construction project and/or considered to be a hub of construction activity. For example, a data collection asset may be a large shovel or crane that is serviced by other assets. However, in some embodiments, use of the DCD 106 may not be limited to a data collection asset. For example, the DCD may be used with any asset, or may be a standalone device.

The FCD 104 of the system 100 may also be configured to receive and transmit the asset data from the AMD 102 (e.g., during fueling of the asset). The FCD 104 and the DCD 106 are configured to transfer the asset data and/or the fueling data back to a central server 108 to be read and analyzed. Further, the FCD 104 and the DCD 106 are configured to receive central data from the central server 108 and transmit central data to the AMD 102.

As illustrated in FIG. 1, the AMD 102 is configured to communicate wirelessly with the FCD 104 and the DCD 106. The FCD 104 and the DCD 106 may also communicate wirelessly with the central server 108. The communication may be through any form of wireless communication. For example, in one embodiment, the communication 110 between the AMD 102 and the FCD 104 and/or DCD 106 is a radio communication, such as a 900 MHz radio communication, and the communication 112 between the FCD and/or DCD and the central server 108 is a cellular communication. In another embodiment, the communication 112 between the FCD 104 and/or DCD 106 and the central server 108 is through a Wi-Fi Network of a field office that is connected to the central server through a WAN connection.

In one embodiment, the FCD 104 of the system 100 may also be configured to communicate wirelessly with the DCD 106. The communication may be through any form of wireless communication. For example, the communication 114 between the FCD 104 and the DCD 106 may be a radio communication, such as a 900 MHz radio communication. The FCD 104 may be configured to transmit and receive asset, fueling, or central data to and from the DCD 106. Further, the DCD 106 may be configured to transmit and receive asset, fueling, or central data to and from the FCD 104.

Figure 2:
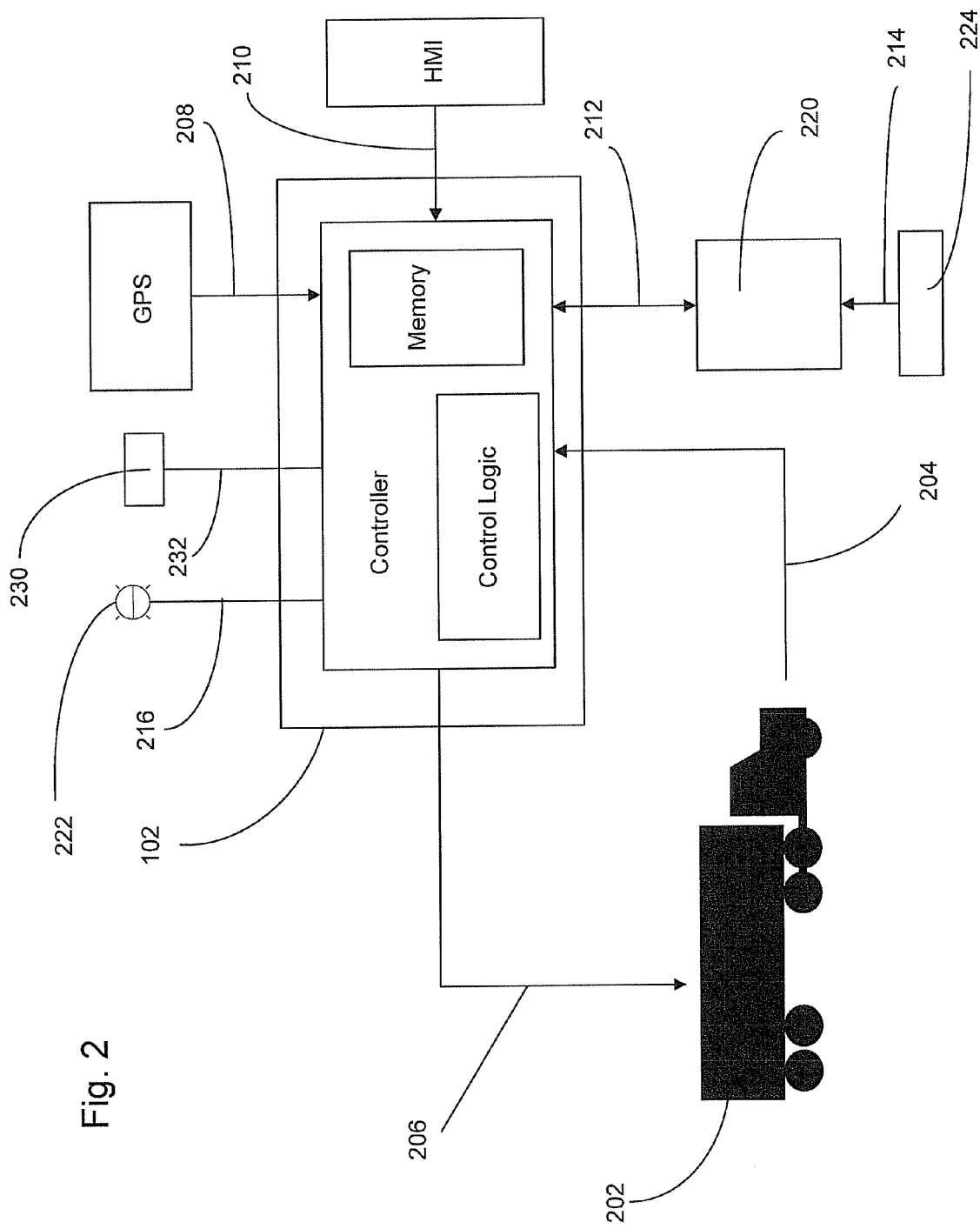
FIG. 2 illustrates an asset monitoring device according to an embodiment of the present application.

The AMD 102 of the present application is generally mounted to or otherwise secured to an asset 202. As illustrated in FIG. 2, the AMD 102 includes a controller with control logic and a memory. The controller is preferably processor-based and can have various input/output circuitry, including but not limited to analog-to-digital (A/D) inputs and digital-to-analog (D/A) outputs. The controller is connected to various sensors and switches of the asset 202 (e.g., through the J1939 communication bus of the asset). The sensors and switches may communicate wirelessly or non-wirelessly with the controller. These sensors and switches send data or signals 204 indicative of the asset's use to the controller to be read and analyzed. For example, data or signals related to the asset's ignition, engine RPM, load, power take-off (PTO), tire pressure, temperature, alarms, and J1939 parameters are sent to the controller to be read and analyzed. The controller may also be configured to send data or signals 206 to various sensors and switches of the asset 202 (e.g., the asset's ignition, an indicator, a solenoid, etc.), for example, to turn on/off the asset's ignition, turn on/off an indicator, open/close a valve, etc.

The AMD 102 may also be connected to a Global Positioning System ("GPS") module. The GPS module may be separate from, or a component of, the AMD 102. The controller may be connected to the GPS module to receive data or signals 208 indicative of the asset's position and speed, as well as time and date information. For example, data or signals related to the asset's latitude, longitude, altitude, speed, and direction may be sent to the controller to be read and analyzed. The GPS module may communicate wirelessly or non-wirelessly with the controller.

Further, the AMD 102 may be connected to a human machine interface ("HMI"), such as a RFID card reader, keypad with a LCD display, or touch screen. The HMI may be separate from, or a component of, the AMD 102. The controller may be connected to the HMI to receive data or signals 210 indicative of an operator's identity. For example, data or signals related to the operator's ID number, name, or security code (e.g., a password or PIN) may be sent to the controller to be read and analyzed. The HMI may communicate wirelessly or non-wirelessly with the controller.

The AMD 102 may be connected to one or more switches or buttons 230. The switches or buttons 230 may be separate from, or a component of, the AMD 102. The controller of the AMD 102 may be connected to the switches or buttons 230 to receive data or signals 232 for initiating various processes of the AMD 102. For example, a user of a fuel source or operator of the asset 202 may manipulate a switch or button 230 to start the transfer of asset data from the AMD 102 to the FCD 104. The switches or buttons 230 may communicate wirelessly or non-wirelessly with the controller.

The AMD 102 may also be connected to a handheld device 220. The handheld device 220 may communicate wirelessly or non-wirelessly with the AMD 102. The handheld device 220 includes a controller with control logic and a memory. The controller is preferably processor-based and can have various input/output circuitry, including but not limited to analog-to-digital (A/D) inputs and digital-to-analog (D/A) outputs. The controller of the AMD 102 may be connected to the handheld device 220 to receive data or signals 212 collected by the handheld device. For example, data or signals related to the inspection of the asset 202, temperature, weather conditions, position of the asset, or other data or signals may be sent to the controller of the AMD 102 to be read and analyzed. The handheld device 220 may also include a display, keypad, or touch screen that permits the operator to enter data that may be sent to the controller of the AMD 102 to be read and analyzed. Further, the controller of the handheld device 220 may be configured to receive data or signals 212 from the AMD 102. For example, data or signals related to the inspection of the asset 202, such as, for example, an inspection checklist, may be sent to the controller of the handheld device 220.

The handheld device 220 may also be connected to a scanning or sensing device 224, such as a barcode scanner, temperature sensor, infrared device, etc. For example, the device 224 may be used to scan or sense portions of the asset 202 during an inspection. The device 224 may be separate from, or a component of, the handheld device 220. The controller of the handheld device 220 may be connected to the device 224 to receive data or signals 214 related to the scanned or sensed portions of the asset 202. For example, in one embodiment, the operator of the asset 202 inspects various inspection locations of the asset found on an inspection checklist housed on the handheld device 220. The operator uses the device 224 to scan an identification device located at each inspection location. Once the operator scans the identification device, the device 224 sends data or signals to the controller of the handheld device 220 and the corresponding inspection checklist item is electronically "checked" on the handheld device. The controller of the handheld device 220 may then send data or signals related to the results of the inspection and any discrepancies to the controller of the AMD 102 to be read and analyzed.

The handheld device 220 may be a variety of devices, such as, for example, a multi-meter, PDA, smart phone, or key fob type device. For example, in one embodiment, the handheld device 220 is a ruggedized box similar in form to a multi-meter or a PDA. In another embodiment, the functionality of the handheld device 220 is integrated into a smart phone using Bluetooth or barcode scanning capabilities, or an external RFID module.

The controller of the AMD 102 is configured to log the data collected, or generated, from the various sensors and switches of the asset 202, the GPS module, the HMI, the handheld device 220, and switches or buttons 230. The controller may be configured to log the data constantly or intermittently at a specified time or other interval. This data log contains asset data that is transferred to the FCD 104 or the DCD 106.

The AMD controller may include a variety of logic or instructions. For example, the AMD controller may include logic or instructions for generating productivity or efficiency data about the asset 202. In one embodiment, one or more hour counters are used to generate the operating and PTO hours of the asset 202 by using the data or signals related to the asset's ignition and PTO. Further, the asset's production hours may be generated using the data or signals from the asset's sensors and switches (e.g., the asset's engine RPM) and the GPS module (e.g., the asset's speed). The AMD controller may also include logic or instructions for monitoring the RPM of the engine and determining whether the asset 202 has been idle for more than a predetermined amount of time.

Further, the AMD controller may include logic or instructions for monitoring and logging the asset data, including the productivity or efficiency data generated about the asset. The controller may also include logic or instructions for transmitting asset data to the FCD 104 (e.g., during fueling of the asset) and/or the DCD 106. The controller may include logic or instructions for receiving central data from the FCD 104 and/or the DCD 106.

The AMD controller may include logic or instructions for determining whether a particular operator is authorized to start the asset 202. If the operator is authorized to start the asset 202, the controller sends a signal to enable the ignition of the asset. The AMD controller may also include logic or instructions for scanning radio channels for a sync frame from a FCD or a DCD, determining the source of the sync frame, and storing information related to or contained in the sync frame. Further, the AMD controller may include logic or instructions for determining how long the asset 202 is permitted to idle after the operator initiates an idle shutdown process. Once the permitted idle time has elapsed, the controller sends a signal to turn off the ignition and shut down the engine of the asset 202.

As illustrated in FIG. 2, the controller of the AMD 102 may also be connected to an indicator 222, such as a visual indicator (e.g., light or sign) or audible indicator (e.g., a horn or buzzer), of the asset 202. The AMD controller may include logic or instructions for determining whether the asset 202 requires fuel. If no fuel is required, the controller sends a signal 216 to turn on the indicator 222.

The controller of the AMD 102 may include logic or instructions for transmitting and receiving data or signals to and from the handheld device 220. The controller may include logic or instructions for interpreting the data or signals received from the handheld device 220. For example, the AMD controller may include logic or instructions for determining whether an inspection checklist is complete. If the inspection checklist is complete, the controller sends a signal to enable the ignition of the asset 202.

The controller of the handheld device 220 may also include logic or instructions for transmitting and receiving data or signals to and from the AMD 102. Further, the handheld device controller may include logic or instructions related to scanning or sensing various portions of the asset 202, interpreting the results thereof, and transmitting the results, or the interpretation of the results, to the AMD 102.

In the embodiments disclosed herein, the AMD 102 may include any one or more of the following: a power supply, a microprocessor, a memory, digital inputs, digital outputs, relay outputs, a frequency input, CAN ports (one of which may be configured to support J1939 ECU data communications), a radio transceiver (e.g., 900 MHz), a GPS, a remote pushbutton and strobe light, an electronic handheld device, and a RFID card reader input. Further, the asset data log may include any one or more of the following: log ID, log type, date/time, asset ID, operator ID, latitude, longitude, altitude, speed, operating hours, production hours, PTO hours, GPS status, North/South, East/West, digital input status, digital output status, software version, last fueling date and time of the asset, inspection data, tire pressure, temperature, alarms, J1939 parameters, or other data and parameters.

Figure 3:
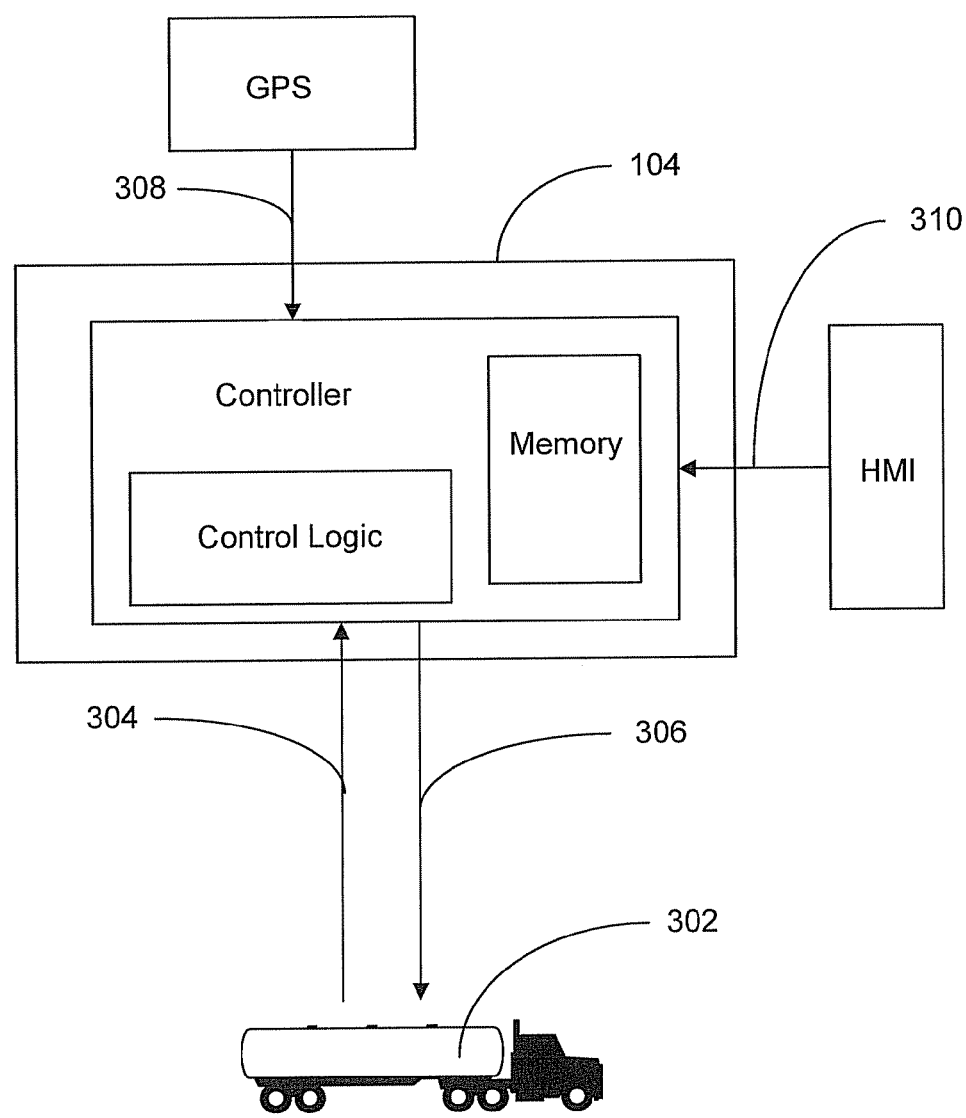
FIG. 3 illustrates a fuel control device according to an embodiment of the present application.

The FCD 104 of the present application is generally mounted to or otherwise secured to a fuel source 302. As illustrated in FIG. 3, the FCD 104 includes a controller with control logic and a memory. The controller is preferably processor-based and can have various input/output circuitry, including but not limited to analog-to-digital (A/D) inputs and digital-to-analog (D/A) outputs. The controller is connected to various sensors and switches of the fuel source 302 (e.g., flow meter(s) and level sensor(s) of the fuel source). The sensors and switches may communicate wirelessly or non-wirelessly with the controller. These sensors and switches send data or signals 304 indicative of the fuel source's fueling of the asset 202 to the controller to be read and analyzed. For example, data or signals related to the fuel source's tank level and the type and amount of fuel dispensed are sent to the controller to be read and analyzed. The controller may also be configured to send data or signals 306 to various sensors and switches of the fuel source 302 (e.g., an indicator(s), a fuel control solenoid(s), etc.), for example, to turn on/off an indicator, to open/close a valve and restrict the amount of fuel dispensed, etc.

The FCD 104 may also be connected to a GPS module. The GPS module may be separate from, or a component of, the FCD 104. The controller may be connected to the GPS module to receive data or signals 308 indicative of the fuel source's position and speed, as well as time and date information. For example, data or signals related to the fuel source's latitude, longitude, altitude, speed, and direction may be sent to the controller to be read and analyzed. The GPS module may communicate wirelessly or non-wirelessly with the controller.

Further, the FCD 104 may be connected to a HMI, such as a RFID card reader, keypad with a LCD display, or a touch screen. The HMI may be separate from, or a component of, the FCD 104. The controller may be connected to the HMI to receive data or signals 310 indicative of the operator's identity or the asset to be fueled. For example, data or signals related to the operator's ID number, name, or security code (e.g., a password or PIN) may be sent to the controller to be read and analyzed. Data or signals identifying the asset to be fueled (e.g., if the asset does not include an AMD) may also be sent to the controller to be read and analyzed. The HMI may communicate wirelessly or non-wirelessly with the controller.

The controller of the FCD 104 is configured to log the data collected, or generated, from the various sensors and switches of the fuel source 302, the GPS module, and the HMI. The controller may be configured to log the data constantly or intermittently at a specified time or other interval, e.g., before and/or after the fueling process, at specified time intervals during the fueling process, etc. This data log contains the fueling data that is transferred from the FCD 104 back to the central server 108.

The FCD controller may include a variety of logic or instructions. For example, the controller may include logic or instructions for restricting access to the fuel, monitoring the fueling of the asset 202, and logging the fueling data. Further, the controller may include logic or instructions for receiving and logging the asset data from the AMD 102 or transmitting to the AMD central data (e.g., an authorized operator list, shut down times, software updates, inspection checklists, etc.) received from the central server 108. The controller may also include logic or instructions for transmitting asset data and fueling data to the central server 108 or receiving central data from the central server. The controller may also include logic or instructions for broadcasting a sync frame.

In the embodiments disclosed herein, the FCD 104 may include any one or more of the following: a power supply, a microprocessor, a memory, digital inputs, analog inputs, counter inputs (e.g., for fuel flow), a frequency input, digital outputs, relay outputs, CAN ports (one of which may be configured to support J1939 ECU data communications), an Ethernet port, a radio transceiver (e.g., 900 MHz), a Wi-Fi interface (e.g., 802.11a, b, g, n), a GPS, a remote pushbutton and strobe light, a cellular communication module, a RFID card reader, a keypad, and a LCD display. Further, the fueling data log may include any one or more of the following: log ID, log type, operator ID, fuel tank level, fuel amount, fuel type, GPS data, software version, or other data and parameters. The fueling data log may also include information related to the particular assets fueled using the fuel source 302 including, but not limited to, which assets were fueled, how much fuel was dispensed, what type of fuel was dispensed, etc.

Figure 4:
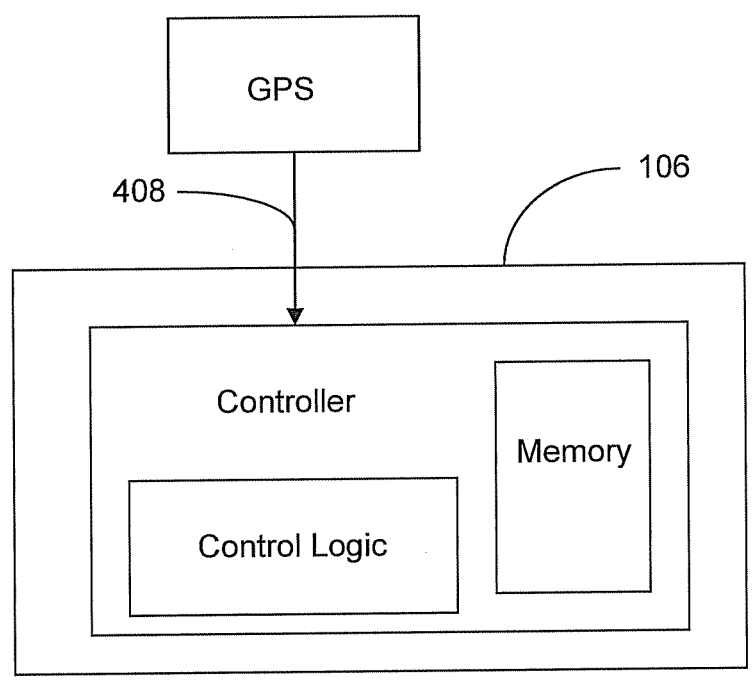
FIG. 4 illustrates a data collection device according to an embodiment of the present application.

The DCD 106 of the present application is generally mounted to or otherwise secured to a data collection asset and serves as a data collection point for various assets utilized in an operation (e.g., a construction operation or project). However, as discussed above, use of the DCD 106 may not be limited to a data collection asset. For example, the DCD may be used with any asset, or may be a standalone device. As illustrated in FIG. 4, the DCD 106 includes a controller with control logic and a memory. The controller is preferably processor-based and can have various input/output circuitry, including but not limited to analog-to-digital (A/D) inputs and digital-to-analog (D/A) outputs.

The DCD 106 may also be connected to a GPS module. The GPS module may be separate from, or a component of, the DCD 106. The controller may be connected to the GPS module to receive data or signals 408 indicative of the data collection asset's position and speed, as well as time and date information. For example, data or signals related to the data collection asset's latitude, longitude, altitude, speed, and direction may be sent to the controller to be read and analyzed. The GPS module may communicate wirelessly or non-wirelessly with the controller.

The DCD controller may include a variety of logic or instructions. For example, the controller may include logic or instructions for receiving and logging the asset data from the AMD 102 or transmitting to the AMD central data (e.g., an authorized operator list, shut down times, software updates, inspection checklists, etc.) received from the central server 108. The controller may also include logic or instructions for transmitting asset data to the central server 108 or receiving central data from the central server. Further, the controller may include logic or instructions for broadcasting a sync frame.

In the embodiments disclosed herein, the DCD 106 may include any one or more of the following: a power supply, a microprocessor, a memory, digital inputs, analog inputs, counter inputs, a frequency input, digital outputs, relay outputs, CAN ports (one of which may be configured to support J1939 ECU data communications), an Ethernet port, a radio transceiver (e.g., 900 MHz), a Wi-Fi interface (e.g., 802.11a, b, g, n), a GPS, a remote pushbutton and strobe light, a cellular communication module, and a computer operating system (e.g., Windows OS).

Figure 5:
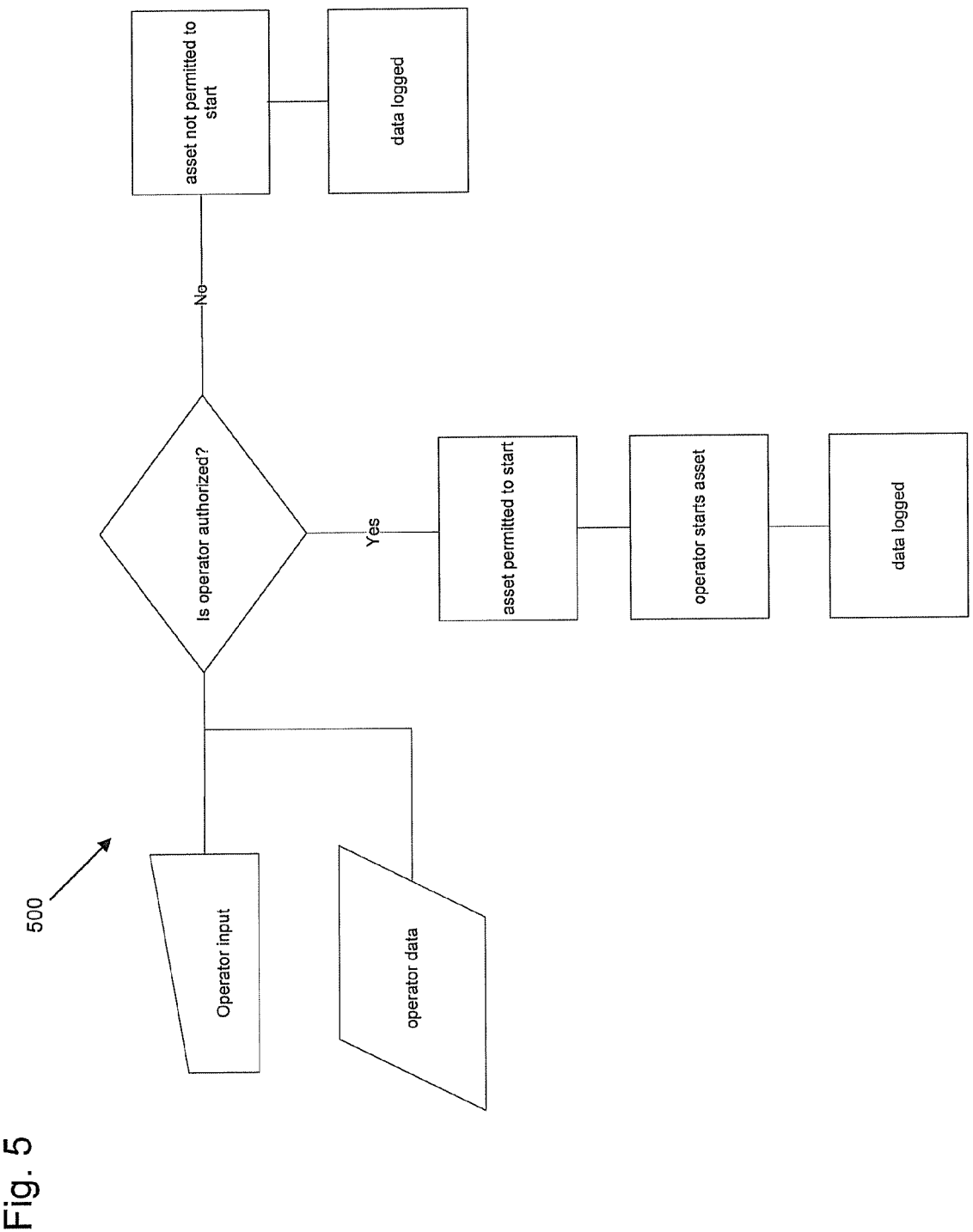
FIG. 5 illustrates a method of starting an asset according to an embodiment of the present application.

FIG. 5 illustrates an exemplary method 500 of starting an asset 202 having an AMD 102 according to an embodiment of the present application. An operator of the asset 202 inputs information into the HMI connected to the AMD 102 that identifies the operator. For example, the operator may swipe an ID card past a RFID card reader or enter an identification number using a keyboard or touch screen. Data or signals indicative of the operator's identity are sent from the HMI to the controller of the AMD 102.

As illustrated in FIG. 5, the control logic of the AMD controller uses the operator input to determine whether the operator is authorized to operate, or start, the asset 202. This may be accomplished, for example, by comparing the operator input against operator data, such as a list of authorized operators for the asset 202, an asset class, a type of asset, etc. An operator may, for example, be authorized to operate the asset 202 based on his or her abilities, level of training, authorization, employment status, certification, credentials, position, role, hours worked (e.g., consecutive hours worked, overtime, etc.), etc. In one embodiment, the operator data may be central data from the central server 108. For example, a list of authorized operators may be managed and configured on the central server 108 and transmitted to the AMD 102 through the FCD 104 or the DCD 106. In another embodiment, the operator data is uploaded directly to the controller of the AMD 102.

If the control logic of the AMD controller determines that the operator is not authorized to operate the asset 202, the ignition of the asset is, or remains, disabled and the operator is not permitted to start the asset. If the operator is authorized to operate the asset 202, the controller of the AMD 102 sends a signal to enable the ignition of the asset and the operator is permitted to start the asset. The AMD controller may also include logic or instructions to disable the ignition of the asset 202 if the asset is not started within a specified time period. The controller of the AMD 102 may be configured to log data indicative of the operator's identity and when the asset 202 was started, or attempted to be started.

Figure 6:
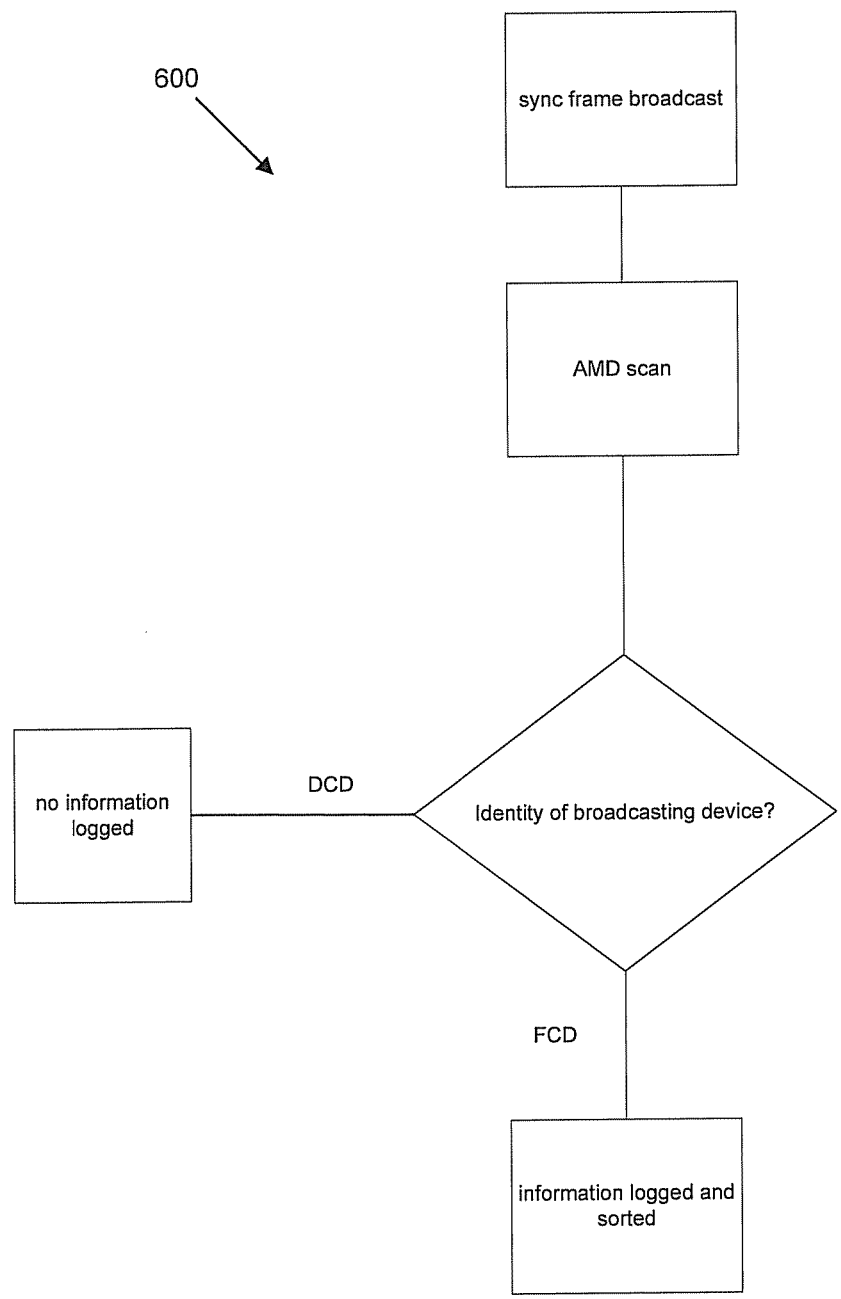
FIG. 6 illustrates a sync frame method according to an embodiment of the present application.

FIG. 6 illustrates an exemplary sync frame method 600 according to an embodiment of the present application. The controller of the FCD 104 and/or the DCD 106 broadcasts a sync frame at a specified radio frequency. The sync frame may include, but is not limited to, information related to the radio address, radio signal strength, date/time, identity of the device (e.g., FCD 104 or DCD 106), and the identity of the fuel source 302 (e.g., fuel truck or fuel station). The AMD controller of the asset 202 scans various radio frequencies for the sync frame. The control logic of the controller uses the sync frame information to determine the identity of the device broadcasting the sync frame. If the sync frame is from the DCD 106, the controller of the AMD 102 does not log the sync frame information. If the sync frame is from the FCD 104, the controller of the AMD 102 logs the sync frame information in a list and sorts the list by signal strength.

Figure 7:
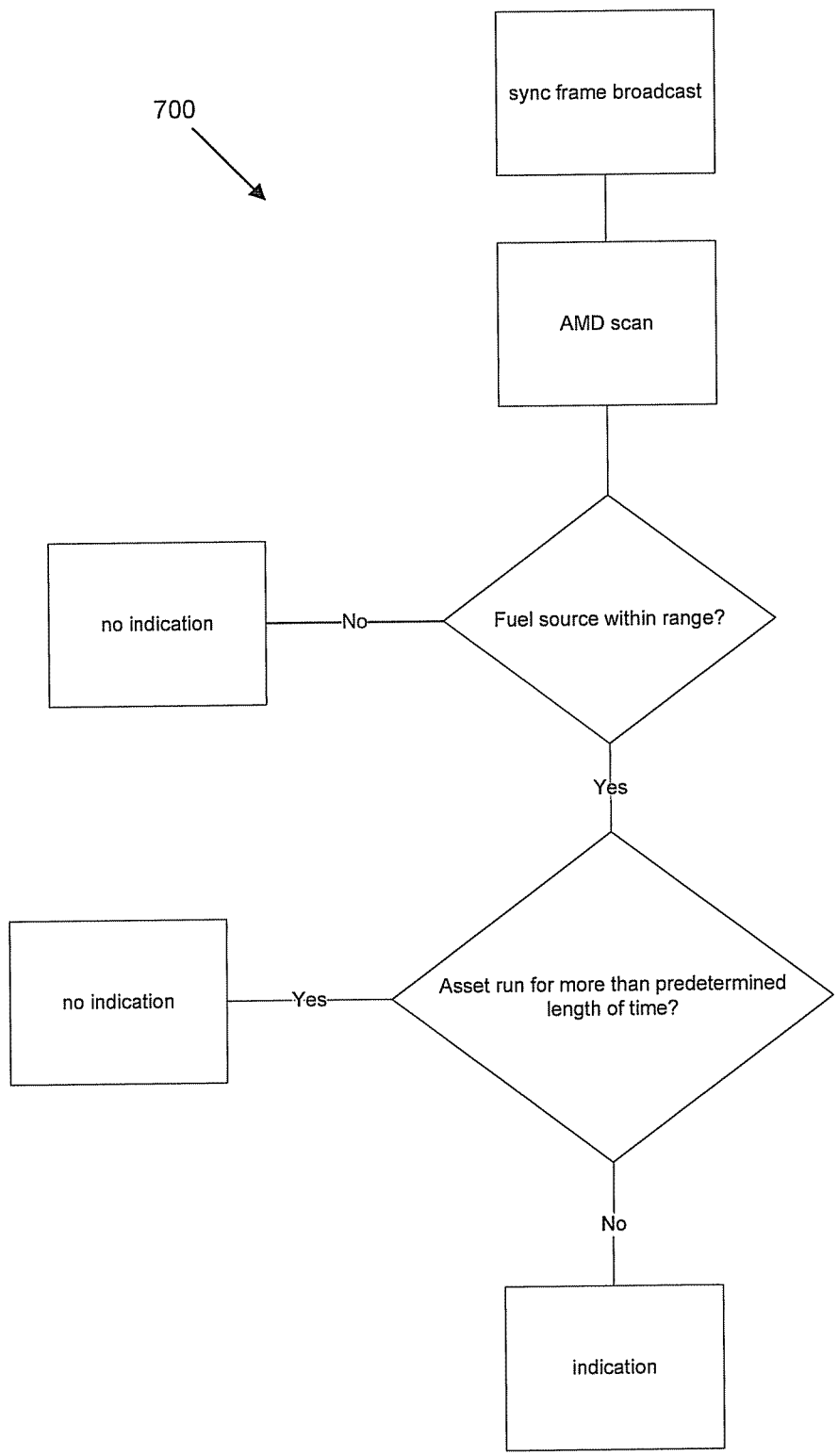
FIG. 7 illustrates a fuel indication method according to an embodiment of the present application.

FIG. 7 illustrates an exemplary fuel indication method 700 according to an embodiment of the present application. As described above in reference to FIG. 6, the FCD controller of the fuel source 302 (e.g., a fuel truck) broadcasts a sync frame at a specified radio frequency. The AMD controller of the asset 202 scans various radio frequencies listening for the sync frame from the FCD 104 of the fuel source 302. The control logic of the AMD controller determines from the sync frame (e.g., from the signal strength) whether the fuel source 302 is within a specified range, such as, for example, within a visible distance from the asset 202, within 1000 feet of the asset, etc. If the fuel source is not within the specified range, no fuel indication is needed.

If the fuel source is within the specified range, the control logic of the AMD controller determines whether the asset 202 has been run for more than a predetermined length of time since the asset was last fueled. The predetermined length of time may be determined based on, for example, the type of asset and whether the asset has enough fuel to last a full shift or remainder of a shift. For example, if a particular asset is capable of running for 12 hours on a single tank of fuel and a shift is 8 hours long, the predetermined length of time may be 4 hours. As such, if the asset has been running for more than 4 hours since it was last fueled when the fuel source is within the specified range, the asset will require fuel to last an entire 8 hour shift. In one embodiment, a list of times for various assets, asset types, or asset classes is managed and configured on the central server 108 and transmitted to the AMD 102 through a FCD 104 or a DCD 106. In another embodiment, a list of times is uploaded directly to the controller of the AMD 102.

In one embodiment, if the asset 202 has not been run for more than the predetermined length of time, the controller of the AMD 102 will send a signal to turn on the indicator 222 (e.g., a light) to notify the fuel source 302 that the asset does not require fuel. As such, the fuel source 302 does not need to stop and inquire whether the asset 202 requires fuel. Further, because the indicator 222 indicates when fuel is not required (as opposed to when fuel is required), the fuel source 302 will stop to fuel the asset 202 when the indicator is not working (e.g., malfunctioning or the light is burnt out). Thus, the fuel source 302 will not refrain from fueling the asset 202 if the indicator 222 is not working. However, in another embodiment, the controller of the AMD 102 will send a signal to turn on the indicator 222 if the asset 202 has been run for more than the predetermined length of time to notify the fuel source 302 that the asset does require fuel. Further, the AMD 102 of an asset 202 may be configured to indicate that fuel is not needed when the asset is not in use (e.g., when the ignition is off). As such, the fuel source 302 can drive past a group of assets that are not in use and determine which asset requires fuel without having to stop and check the fuel level of each asset.

Figure 8:
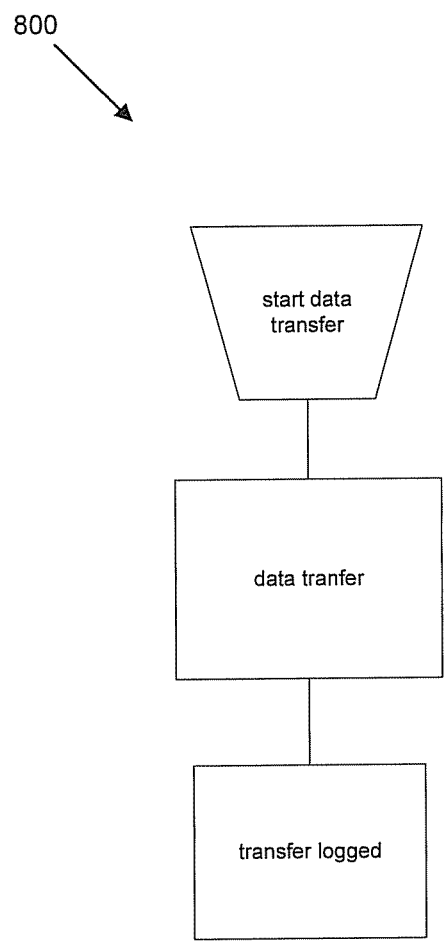
FIG. 8 illustrates a method of transferring data according to an embodiment of the present application.

FIG. 8 illustrates an exemplary method 800 for transferring data between the AMD 102 and the FCD 104. An operator of the asset 202 pushes a button 230 that is connected to the controller of the AMD 102. The controller of the AMD 102 begins to transmit the asset data to the FCD 104. Further, the controller of the FCD 104 begins to transmit the central data from the central server 108 (e.g., an authorized operator list, shut down times, software updates, inspection checklists, etc.) to the AMD 102. In one embodiment, the AMD controller sends a radio communication that includes the asset data to the FCD 104 in the sync frame list with the strongest signal strength, as described above in reference to FIG. 6. Further, the FCD 104 sends a radio communication that includes the central data to the AMD 102 of the asset 202. The transfer of data between the AMD 102 and the FCD 104 may then be logged by the controller of the AMD and/or FCD. The data may be transferred at any time, such as, for example, at any time during the fueling of the asset 202.

Figure 9:
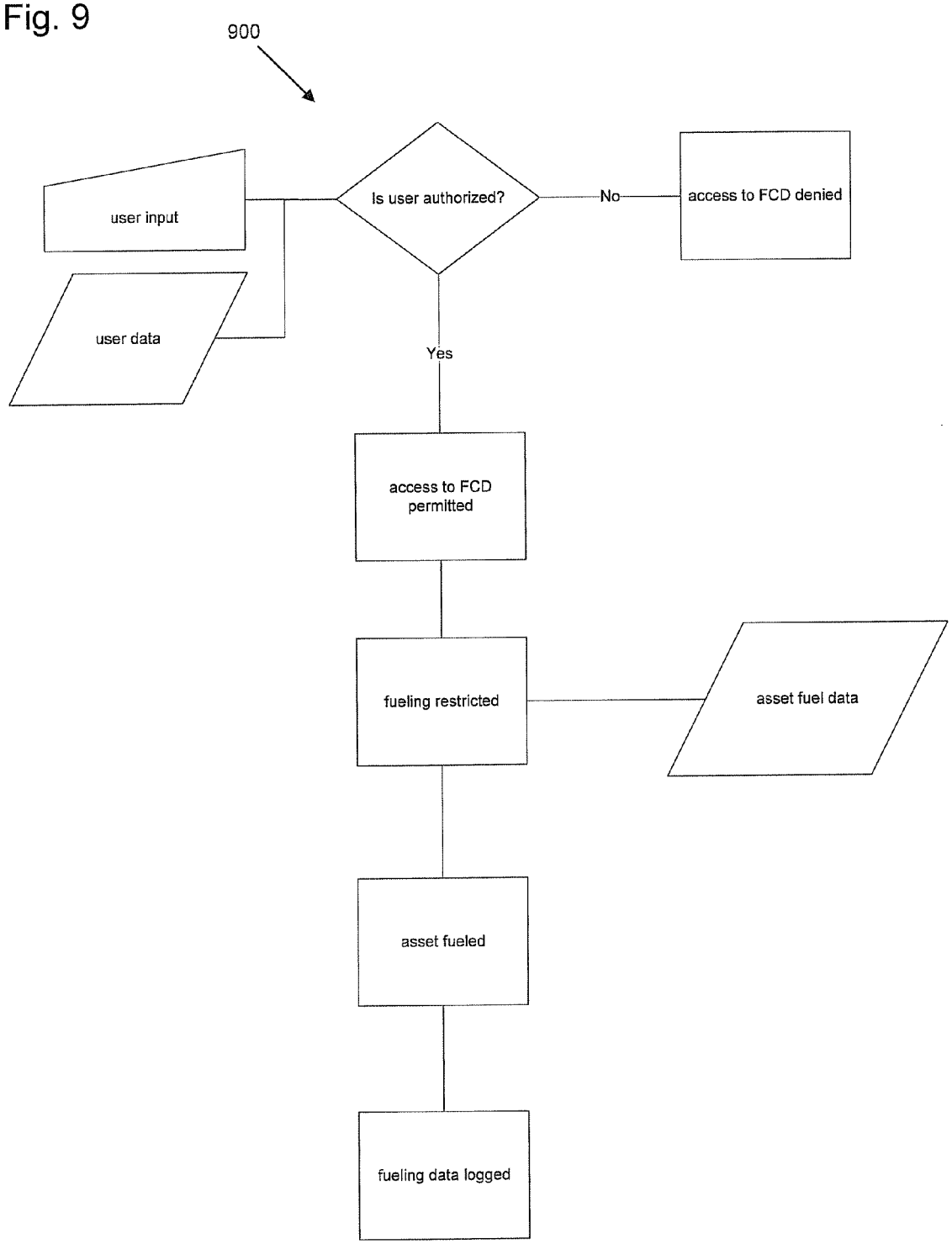
FIG. 9 illustrates a method of fueling an asset according to an embodiment of the present application.

FIG. 9 illustrates an exemplary method 900 for fueling an asset according to an embodiment of the present application. A user of the fuel source 302 (e.g., the operator the fuel source, the operator of the asset 202, etc.) inputs information into the HMI connected to the FCD 106 that identifies the user. For example, the user may swipe an ID card past a RFID card reader or enter an identification number using a keypad or touch screen. Data or signals indicative of the user's identity is sent from the HMI to the controller of the FCD 106.

As illustrated in FIG. 9, the control logic of the FCD controller uses the user input to determine whether the user is authorized to operate the fuel source 302. This may be accomplished, for example, by comparing the user input against user data, such as a list of authorized users for the fuel source 302. A user may, for example, be authorized to operate the fuel source 302 based on his or her abilities, level of training, authorization, employment status, certification, credentials, position, role, hours worked, etc. In one embodiment, the user data may be central data from central server 108. For example, a list of authorized users may be managed and configured on the central server 108 and transmitted to the FCD 104. In another embodiment, the user data is uploaded directly to the controller of the FCD 104. If the user is not authorized to operate the fuel source 302, the user is denied access to the FCD 104. If the user is authorized to operate the fuel source 302, the user is permitted to access the FCD 104.

The controller of the FCD 104 may restrict the fueling of the asset 202 by the fuel source 302, such as, for example, restricting the amount and type of fuel for the asset. The FCD controller may restrict the fueling of the asset 202 in a variety of ways. For example, the control logic of the FCD controller may determine the identity of the asset 202 from asset data received from the AMD 102, as described above in reference to FIG. 8 (e.g., asset ID, type of asset, asset category, asset class, etc.). The controller of the FCD 104 compares this information against asset fuel data, such as, for example, a list of various assets that includes the fuel type and fuel tank volume or fuel capacity for each asset. In one embodiment, the asset fuel data is managed and configured on the central server 108 and transmitted to the FCD 104. Further, the asset fuel data may be uploaded directly to the controller of the FCD 104. The control logic of the FCD controller may also utilize other information provided by the AMD 102 to determine the amount and type of fuel permitted for the asset 202. For example, the control logic of the controller may utilize information related to the fuel level of the asset 202, last time the asset was fueled, and calculated fuel usage of the asset.

The asset 202 may then be fueled by the fuel source 302 pursuant to the restrictions provided by the FCD 104. The asset 202 may be fueled by the fuel source 302 during the transfer of data between the AMD 102 and the FCD 104. Once the asset 202 is fueled by the fuel source 302, the FCD controller logs fueling data related to the fueling process, such as, for example, which asset was fueled, who fueled the asset, and the type and quantity of fuel provided to the asset.

Figure 10:
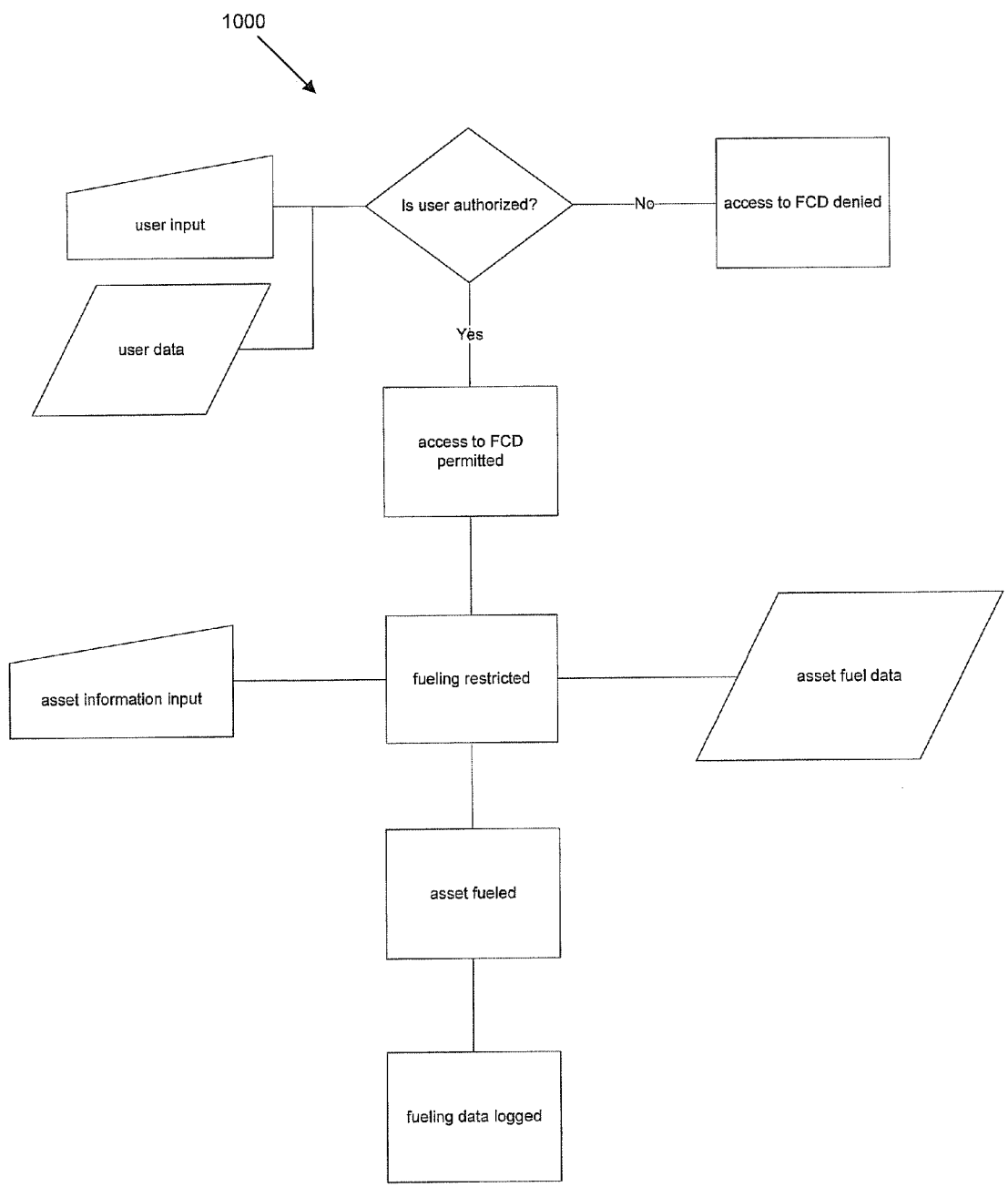
FIG. 10 illustrates a method of fueling an asset according to an embodiment of the present application.

FIG. 10 illustrates an exemplary method 1000 for fueling an asset according to an embodiment of the present application. In particular, the method 1000 may be used to fuel an asset that does not have an AMD or the AMD is unavailable. Similar to the method 900 described in reference to FIG. 9 above, a user of the fuel source 302 inputs information into a HMI of the FCD 104 that identifies the user. Data or signals indicative of the user's identity is sent from the HMI to the controller of the FCD 106. As illustrated in FIG. 10, the control logic of the FCD controller uses the user input to determine whether the user is authorized to operate the fuel source 302. This may be accomplished, for example, by comparing the user input against user data, such as a list of authorized users for the fuel source 302. If the user is not authorized to operate the fuel source 302, the user is denied access to the FCD 104. If the user is authorized to operate the fuel source 302, the user is permitted to access the FCD 104.

The user of the fuel source 302 manually inputs information about the asset to be fueled into the HMI of the FCD 104. For example, the user may input the asset ID, a generic fill code, or other information related to the asset to be fueled. Data or signals indicative of the asset are sent from the HMI to the controller of the FCD 104. The control logic of the controller uses this asset information input to restrict the fueling of the asset by the fuel source 302, such as, for example, by restricting the amount and type of fuel for the asset. The FCD controller may restrict the fueling of the asset in a variety of ways. For example, the controller of the FCD 104 may compare the asset information input against asset fuel data, such as, for example, a list of various assets that includes the fuel type and fuel tank volume for each asset. In one embodiment, the asset fuel data is managed and configured on the central server 108 and transmitted to the FCD 104. Further, the asset fuel data may be uploaded directly to the controller of the FCD 104. The user may also enter information into the HMI of the FCD 104 about the fuel type and the amount of fuel permitted for the asset to be fueled. When this occurs, the control logic of the FCD controller may be configured to restrict the amount and type of fuel for the asset based on this information.

The asset may then be fueled by the fuel source 302 pursuant to the restrictions provided by the FCD 104. Once the asset is fueled by the fuel source 302, the FCD controller logs fueling data related to the fueling process, such as, for example, which asset was fueled, who fueled the asset, and the type and quantity of fuel provided to the asset.

Figure 11:
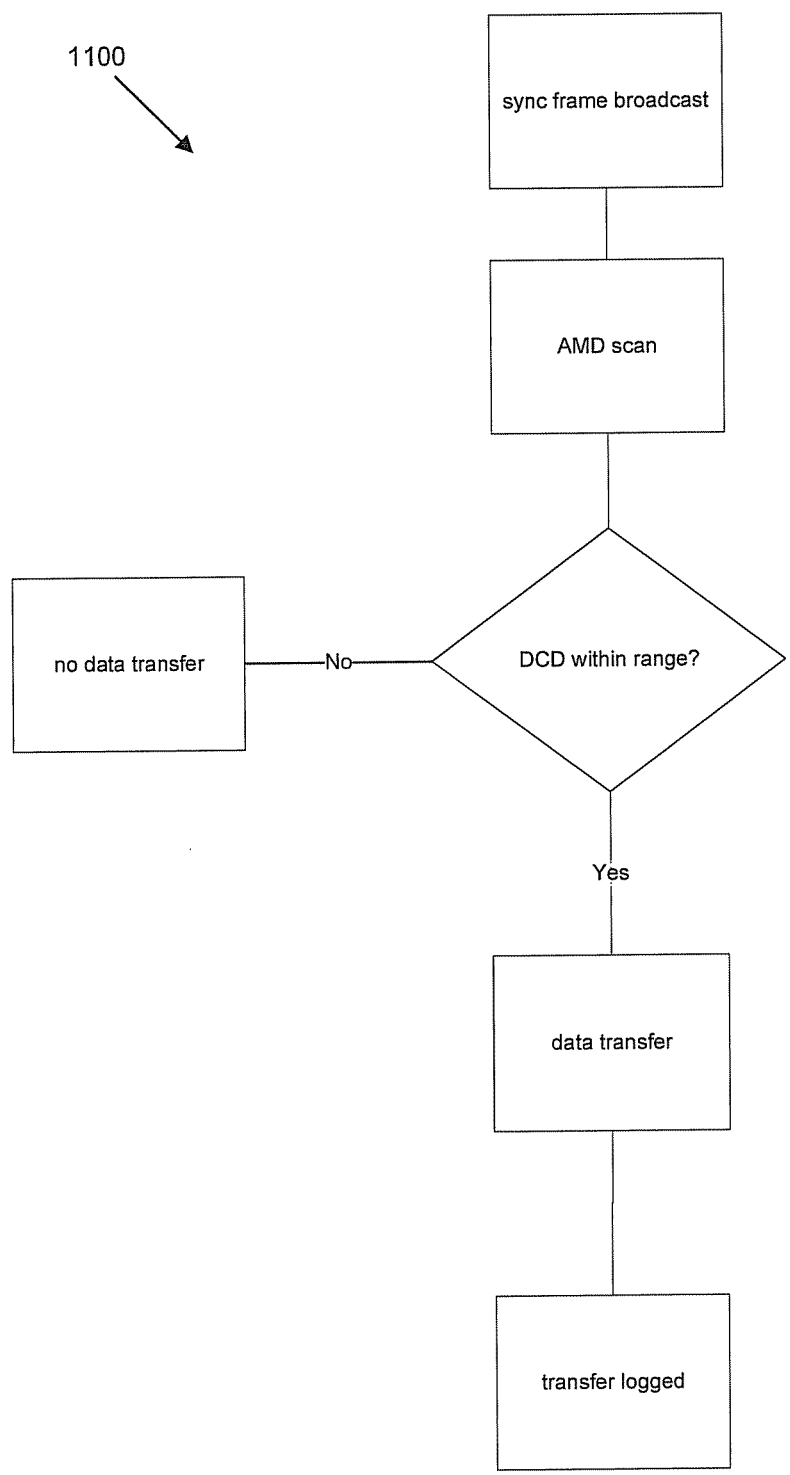
FIG. 11 illustrates a method of transferring data according to an embodiment of the present application.

FIG. 11 illustrates an exemplary method 1100 for transferring data between the AMD 102 and the DCD 106. As described above in reference to FIG. 6, the DCD controller broadcasts a sync frame at a specified radio frequency. The AMD controller of an asset 202 scans various radio frequencies listening for the sync frame from the DCD 106. The control logic of the AMD controller determines from the sync frame (e.g., from the signal strength) whether the DCD 106 is within a specified range, such as, for example, within a visible distance from the asset 202, within 1000 feet of the asset, etc. If the DCD 106 is not within the specified range, no data is transferred between the DCD and the AMD 102 of the asset 202.

If the DCD 106 is within the specified range, the controller of the AMD 102 begins to transmit the asset data to the DCD 106. Further, the controller of the DCD 106 begins to transmit the central data from the central server 108 (e.g., an authorized operator list, shut down times, software updates, inspection checklists, etc.) to the AMD 102. In one embodiment, the AMD controller sends a radio communication that includes the asset data to the DCD 106 with the strongest signal strength. Further, the DCD 106 sends a radio communication that includes the central data to the AMD 102 of the asset 202. The transfer of data between the AMD 102 and the DCD 106 may then be logged by the controller of the AMD and/or DCD.

One advantage to transferring data between the DCD 106 and AMD 102 in this manner is to obtain asset data in a "real-time" manner. As stated, the DCD 106 may be mounted or otherwise secured to a data collection asset. The data collection asset may be a key piece of equipment involved in a productivity role (e.g., the hub of the operation). As such, whenever the asset 202 is within range of the DCD 106, the AMD 102 of the asset would transfer asset data to the DCD. The DCD may then transfer the asset data through a cell modem back to the central server 108 at predetermined intervals, e.g., every 5 or 10 minutes. The asset data may then be utilized remotely using software.

Figure 12:
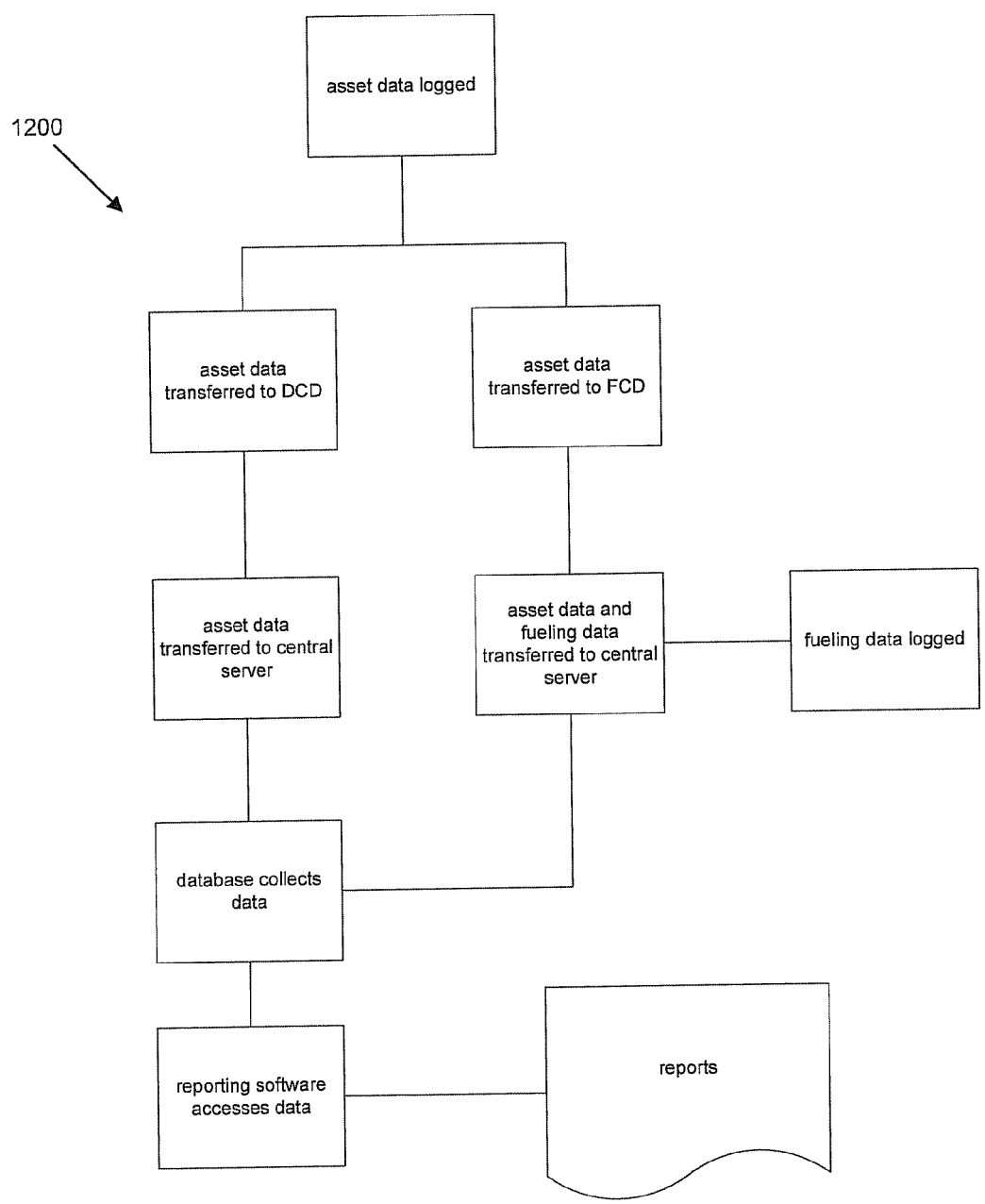
FIG. 12 illustrates a method of transferring data according to an embodiment of the present application.

FIG. 12 illustrates an exemplary reporting method 1200 according to an embodiment of the present application. The AMD 102 of the asset 202 logs data about the asset. This asset data is transmitted to the FCD 104 (e.g., during fueling of the asset 202) and/or the DCD 106. The asset data is then transmitted from the FCD 104 and/or the DCD 106 to the central server 108. Further, the FCD 104 transmits fueling data logged by the FCD to the central server 108. A database (e.g., a SQL database) is housed on the central server 108, or another server connected to the central server. The database collects the asset data and fueling data.

The information in the database may be used for a variety of purposes. For example, various types of software may access and utilize the information in the database. Exemplary types of software include reporting, maintenance, and management software, however, other various types of software or software packages may also be used. Further, the information in the database may be used in a variety of other applications, such as, for example, in a work order system, maintenance system, active idle reduction, depreciation schedules, billing, accounting functions, preventative maintenance, or taxes (e.g., on/off road fuel use, municipal/county/state/federal taxes).

In one embodiment, reporting software accesses the information in the database, including the asset data and fueling data, and utilizes the information to produce reports related to the productivity, efficiency, maintenance, security, and fuel management of the various assets and fuel sources. One such type of reporting software is Viewpoint, however other various types of ERP software may be used. Exemplary reports produced using the reporting software include reports related to the amount of fuel dispensed, productivity information, asset idle times, asset utilization, asset operator reports, and maintenance reports.

The database may be configured such that asset data and fueling data is populated in "real time" such that a user of the database may view the actual hours, actual fuel, last fueled date, etc. for an asset. Further, information needed to perform a fuel charging, preventive maintenance, and/or hour meter analysis may also be included in the reporting software. The productivity information reports may include, for example, asset idle time, asset utilization (working vs. idle time), load counts, cycle times, loads per hour calculations, distance traveled, etc.

Figure 13:
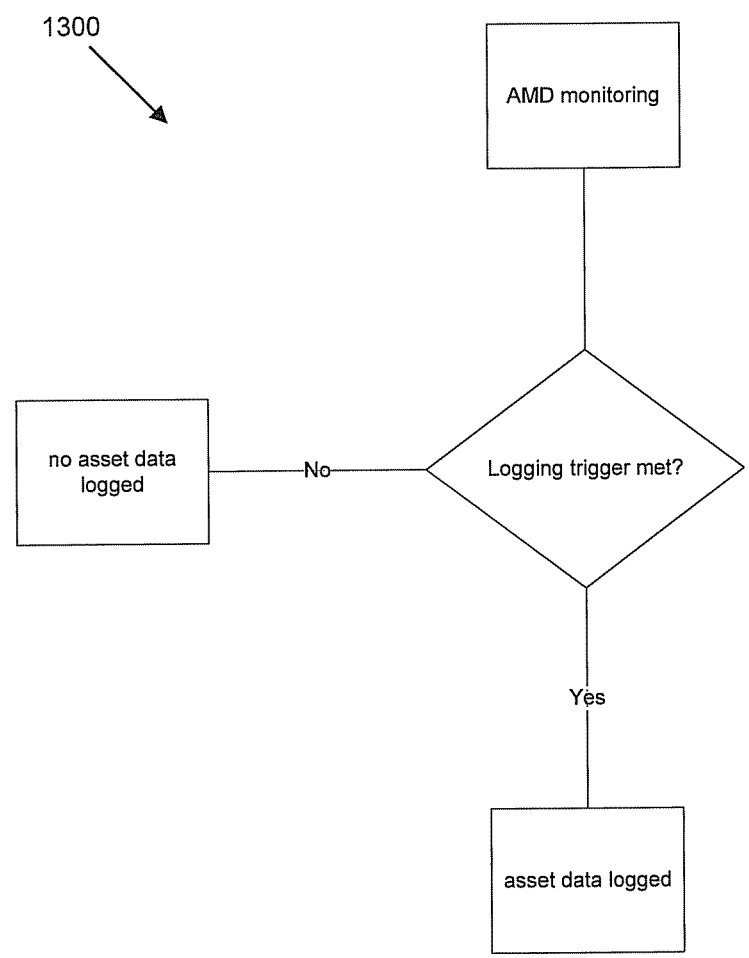
FIG. 13 illustrates a method logging asset data according to an embodiment of the present application.

FIG. 13 illustrates an exemplary method 1300 of logging asset data of the asset 202. The AMD controller of the asset 202 monitors the digital I/O status of the asset. The controller of the AMD 102 determines whether any of the configurable logging triggers have been met. These logging triggers may include, for example, a specified interval, digital I/O change of state, when the asset 202 begins idle, when the asset ends idle, when the operator starts the asset, when the asset resets, or when the asset firmware is updated. Further, the logging trigger may be based on other information, such as GPS position of the asset 202 or various J1939 ECU data communications. If the logging trigger has not been met, the controller of the AMD 102 does not log the asset data. If the logging trigger has been met, the controller of the AMD 102 logs the asset data.

Figure 14:
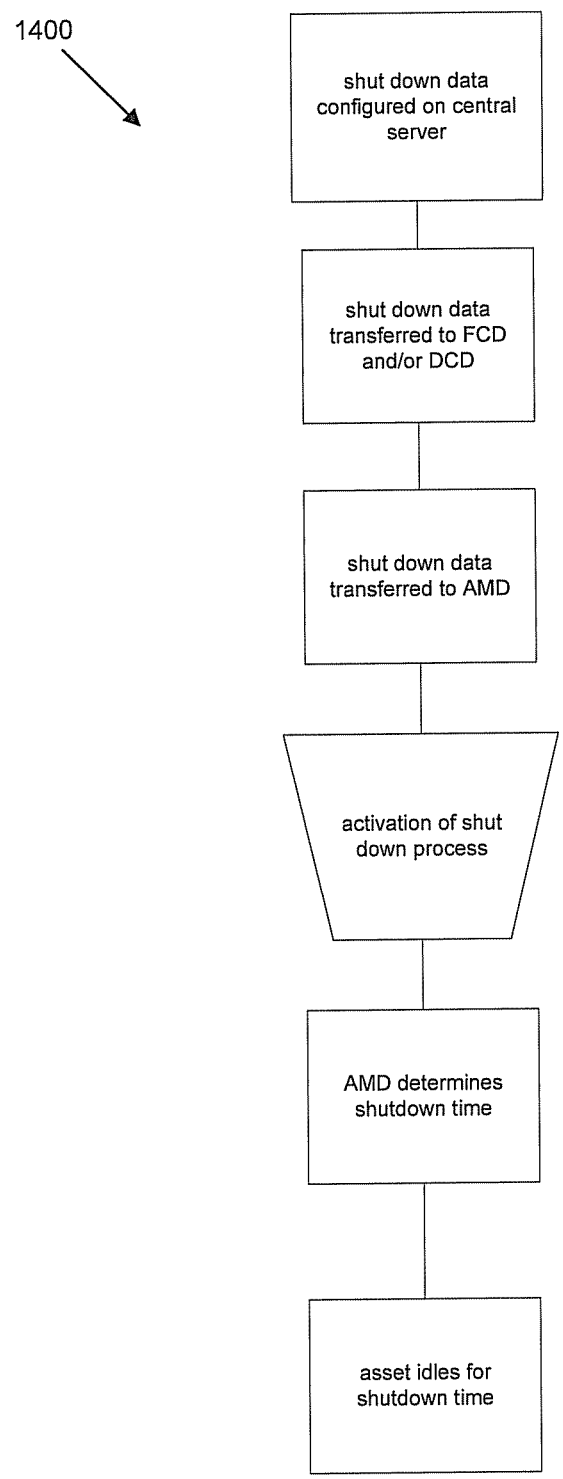
FIG. 14 illustrates an asset shutdown method according to an embodiment of the present application.

FIG. 14 illustrates an exemplary idle shut down process 1400 for an asset 202. Shut down data, such as shut down times for a particular asset, asset type, asset category, and/or asset class, are managed and configured using software on the central server 108. The shut down data may be configured based on user preferences. Further, the shut down data may be configured using various information, such as asset data collected from one or more assets, weather forecasts, ambient temperature, climate, season, or location. The shut down data is transmitted from the central server 108 to the FCD 104 and/or the DCD 106. The FCD 104 and/or the DCD 106 transmit the shut down data to the AMD 102 of the asset 202. The operator of the asset 202 activates the shut down process of the asset and turns off the ignition. For example, the shut down process may be activated automatically when the ignition is turned off or by use of a switch or button that sends a signal to the AMD 102 of the asset 202. The control logic of the AMD controller uses the shut down data to determine the amount of time the asset 202 is permitted to idle after shutdown. This may be accomplished, for example, by comparing the asset data against a list of shut down times. The asset 202 continues to idle after shutdown for the permitted shut down time.

Figure 15:
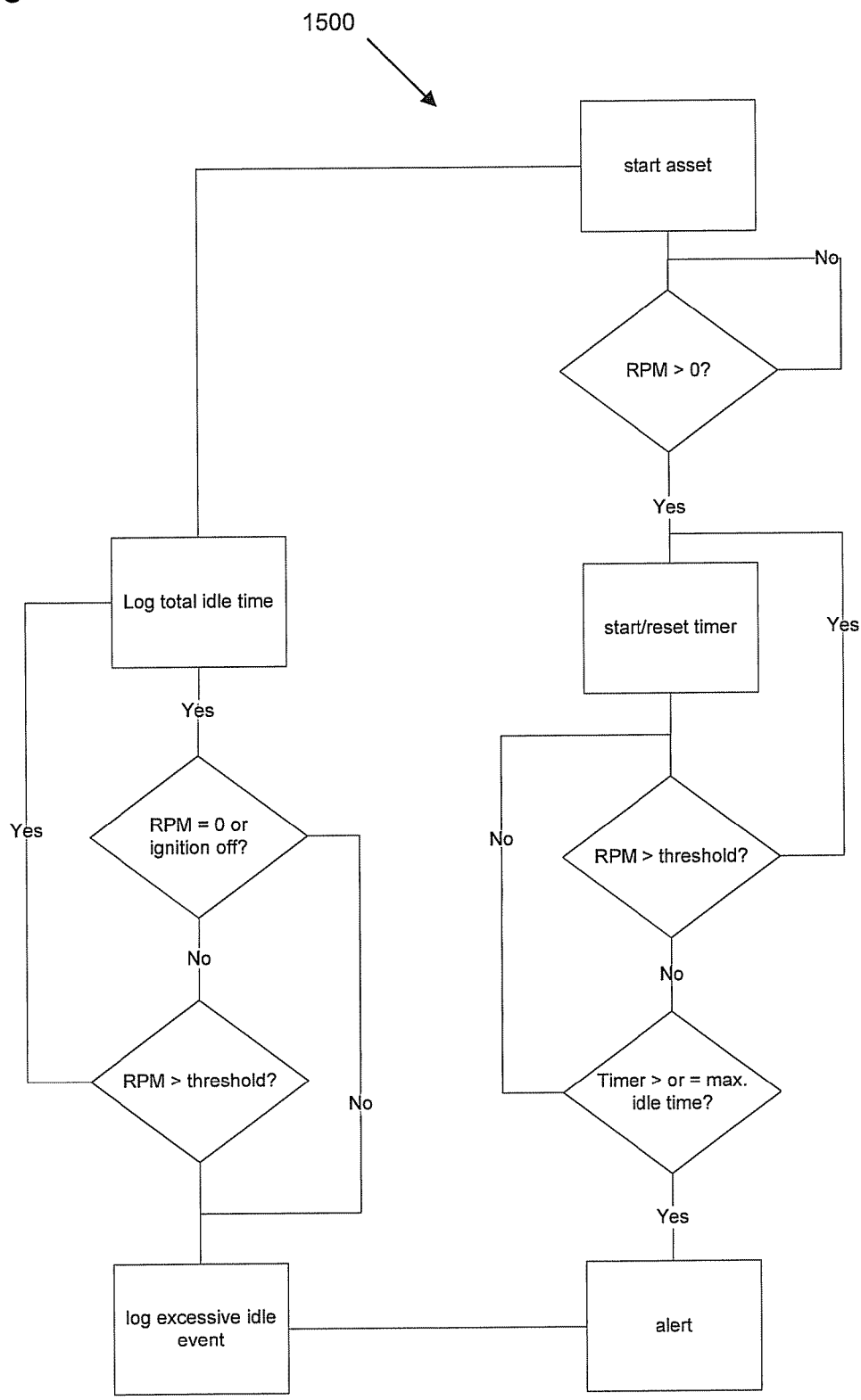
FIG. 15 illustrates an asset idle method according to an embodiment of the present application.

FIG. 15 illustrates an exemplary method 1500 of monitoring idle time of an asset 202. An operator starts the asset 202 and the AMD controller monitors whether the RPM of the engine is greater than zero. When the RPM of the engine is greater than zero, the control logic of the AMD controller starts a timer that tracks the idle time of the engine as long as the RPM of the engine is less than a predetermined threshold RPM. If the RPM of the engine is greater than the threshold RPM, the timer will reset. However, if the RPM of the engine is less than the threshold RPM, the timer will continue to run. If the timer reaches a predetermined maximum idle time (e.g., 5 minutes), the controller of the AMD 102 will send a signal to an indicator (e.g., a horn, light, electronic signal, etc.) to alert the operator of the asset (or supervisor) that the asset has been idling for the maximum idle time. The controller of the AMD 102 then logs the excessive idle event.

The controller of the AMD 102 will then continue to monitor whether the RPM of the engine is greater than the RPM threshold. Once the RPM is greater than the RPM threshold, the controller of the AMD 102 will log the total idle time and the timer will reset. However, if the engine RPM is less than the RPM threshold, the controller of the AMD 102 determines whether the engine RPM is zero or if the ignition of the asset 202 is turned off. If the engine RPM is zero or if the ignition of the asset 202 is turned off, the controller of the AMD 102 will log the total idle time. However, if the engine RPM is not zero or if the ignition of the asset 202 is not turned off, the controller of the AMD 102 will continue to monitor the engine RPM. The controller of the AMD 102 will continue to monitor the engine RPM until it is greater than the RPM threshold or zero, or if the ignition of the asset 202 is turned off.

In other embodiments, other information may be used to monitor the idle time of an asset 202. For example, the PTO output, speed, exhaust output, GPS, or an internal input (e.g., parking brake, etc.) may be used to monitor the idle time of the asset 202. Similar to the RPM of the asset 202 in exemplary method 1500 described above, any one or more of these items may be monitored to determine whether the asset is idle and a timer may be used to track the idle time of the asset.

Figure 16:
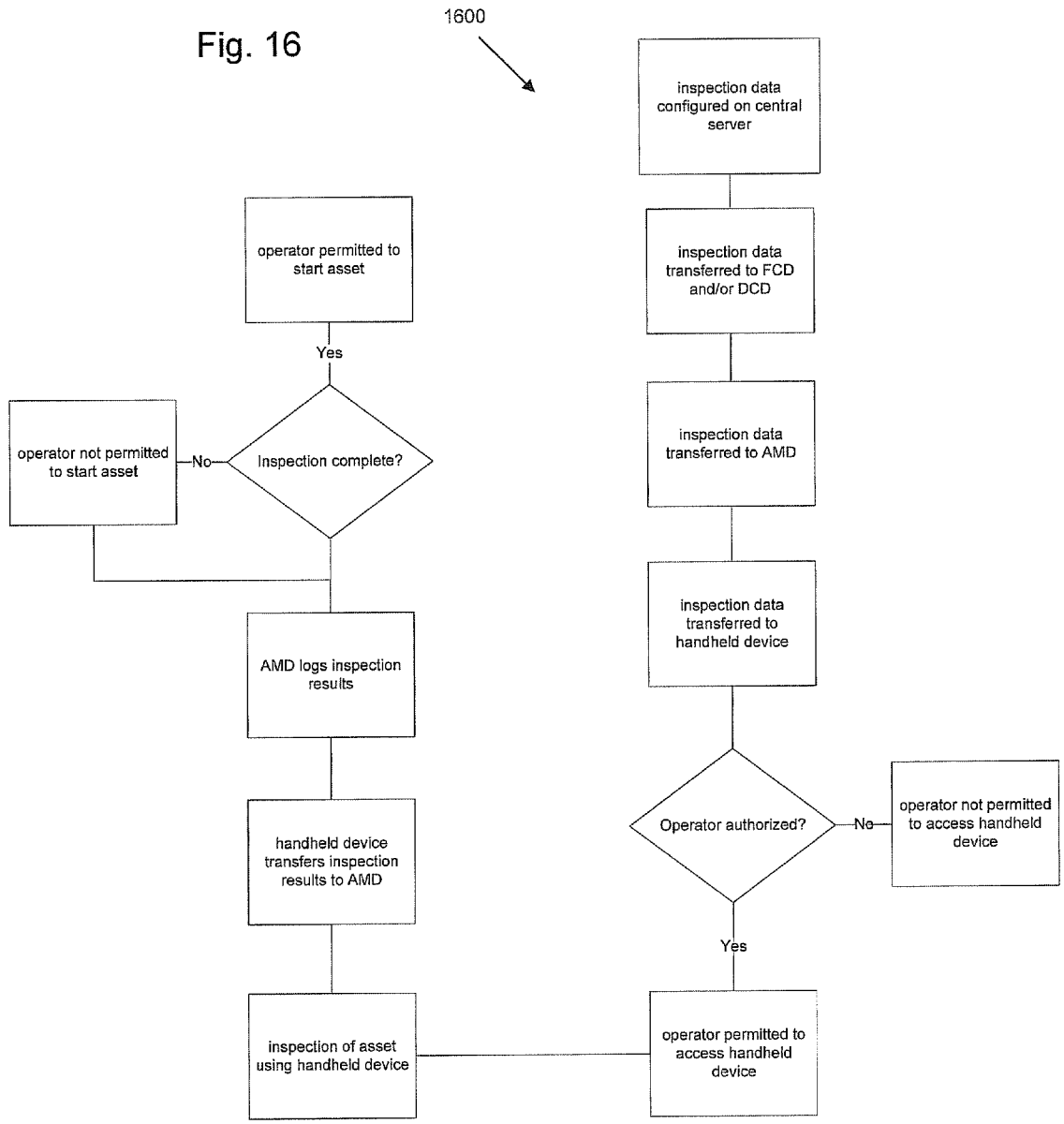
FIG. 16 illustrates an asset inspection method according to an embodiment of the present application.

FIG. 16 illustrates an exemplary method 1600 of inspecting the asset 202. Inspection data, such as, for example, inspection checklists for a particular asset, asset type, asset category, and/or asset class, are managed and configured using software on the central server 108. The inspection data may be configured based on user preferences. Further, the inspection data may be configured using various information, such as asset data collected from the various assets, operating manuals, maintenance schedules, etc. The inspection data is transmitted from the central server 108 to the FCD 104 and/or the DCD 106. The FCD 104 and/or the DCD 106 transmit the inspection data to the AMD 102 of an asset 202. The AMD 102 of the asset 202 transmits the inspection data for the asset 202 to the handheld device 220. As described above in reference to FIG. 5, the operator of the asset 202 inputs information into the HMI of the AMD 102 that identifies the operator. If the operator is authorized to operate the asset 202, the operator is permitted to access the handheld device 220. If the operator is not authorized to operate the asset 202, the operator is not permitted to access the handheld device 220.

The operator performs an inspection of the asset 202 using the inspection data on the handheld device 220. For example, the operator of the asset 220 may inspect various inspection locations of the asset listed on an inspection checklist. Further, the operator may use the sensing or scanning device 224 of the handheld device 220 to sense a particular area of the asset 202 (e.g., temperature) or scan an identification device (e.g., a barcode or RFID tag) located at each inspection location, e.g., to verify that the operator was actually at the specified inspection location. Once the operator senses the particular area or scans the identification device, the associated inspection checklist item may be electronically "checked" on the handheld device 220. The handheld device 220 then transmits the results of the inspection and any discrepancies to the AMD 102. The controller of the AMD 102 logs the operator ID, whether the checklist was completed, and whether there were any checklist discrepancies. The controller of the AMD 102 also determines whether the checklist was completed. If the checklist was not completed, the ignition of the asset 202 is, or remains, disabled and the operator is not permitted to start the asset until the checklist is complete. If the checklist was completed, the controller of the AMD 102 sends a signal to enable the ignition of the asset 202 and the operator is permitted to start the asset.

The control or flow logic shown and described herein preferably resides in or on a computer readable medium such as, for example, a Read-Only Memory (ROM), Random-Access Memory (RAM), programmable read-only memory (PROM), electrically programmable read-only memory (EPROM), electrically erasable programmable read-only memory (EEPROM), magnetic disk or tape, and optically readable mediums including CD-ROM and DVD-ROM. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

As described in the embodiments above, the system of the present application may be configured to limit the type and amount of fuel permitted for an asset based on information managed and configured at a remote location using maintenance software or ERP system. Further, the system may be configured to control the idle time of an asset based on information (e.g., climate or season) managed and configured at a remote location. This permits operators of the asset to run the asset up until quitting time but still provides proper cool down time for the asset, which maximizes efficiency. The system may also be configured such that an asset will indicate when fuel is not needed when a fuel truck is within range. The system may also include a security feature that permits control over who may start and/or operate an asset based on training and other requirements. The security of the asset may also be based on an operator ID which may be managed and configured at a remote location.

As described in the embodiments above, the system of the present application may be configured to utilize user configurable parameters that may be managed and configured remotely and transferred to an asset or a fuel source. The system may also be configured manage and/or log excessive idle time, elevation change, weight per load, diagnostic error codes, and PTO operation hours. The system may also be configured to collect automated hour meter data. The system of the present application may be configured to integrate fuel management, security, idle time, and data collection into a single system.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

We claim:

1. A system for monitoring a motorized asset, comprising;
   at least one asset monitoring device configured for use with a motorized asset that is powered by a liquid or gaseous fuel, the asset monitoring device comprising a controller having control logic and a memory, wherein the asset monitoring device is configured to collect asset data about the asset;
   at least one fuel control device configured for use with a mobile fuel source for the motorized asset, wherein the mobile fuel source is separate from the asset and capable of being used for more than one motorized asset and fuel provided by the mobile fuel source is the liquid or gaseous fuel used to power the motorized asset, the fuel control device comprising a controller having control logic and a memory, wherein the fuel control device is configured to control the fuel provided to the motorized asset from the fuel source, collect fueling data about fueling of the motorized asset, and wherein the fuel control device is configured to communicate with the asset monitoring device to receive the asset data from the asset monitoring device; and
   a central server configured to communicate with the fuel control device to receive the asset data and the fueling data from the fuel control device, wherein the fuel control device is configured to transmit the asset data and the fueling data to the central server;
   wherein the fuel control device of the mobile liquid or gaseous fuel source broadcasts a sync frame at a specified radio frequency and the asset monitoring device of the motorized asset powered by liquid or gaseous fuel scans radio frequencies listening for the sync frame from the fuel control device and determines from the signal strength of the sync frame whether the mobile fuel source is within a specified range of the motorized asset; and
   wherein, when the mobile fuel source is within the specified range of the motorized asset, the asset monitoring device begins to transmit the asset data to the fuel control device, determines whether the motorized asset has been run for more than a predetermined length of time since the motorized asset was last fueled, and notifies the mobile fuel source whether the motorized asset needs fuel.

2. The system of claim 1, wherein the mobile fuel source is a fuel truck.

3. The system of claim 1 further comprising a data collection device comprising a controller having control logic and a memory, wherein the data collection device is configured to communicate with the asset monitoring device to receive the asset data from the asset monitoring device, and wherein the data collection device is configured to communicate with the central server to transmit the asset data to the central server.

4. The system of claim 3, wherein the data collection device is configured to communicate with the fuel control device to receive the asset data and the fueling data from the fuel control device, and wherein the data collection device is configured to transmit the asset data and the fueling data to the central server.

5. The system of claim 1, wherein the fuel control device is configured to receive central data from the central server and transmit the central data to the asset monitoring device, and wherein the asset monitoring device is configured to receive the central data from the fuel control device.

6. The system of claim 5, wherein the central data is managed on the central server and comprises information about at least one of the motorized asset and users of the asset.

7. The system of claim 1, wherein the asset data comprises signals received by the asset monitoring device through a communication bus of the motorized asset.

8. The system of claim 1, wherein the asset data comprises signals received by the asset monitoring device from at least one of a sensor of the motorized asset and a switch of the asset.

9. The system of claim 1, wherein the asset monitoring device is connected to a GPS module, and wherein the asset data comprises signals received by the asset monitoring device from the GPS module.

10. The system of claim 1, wherein the asset monitoring device is connected to a human machine interface, and wherein the asset data comprises signals received by the asset monitoring device from the human machine interface.

11. The system of claim 1 further comprising a handheld device configured to communicate with the asset monitoring device, wherein the asset data comprises signals received by the asset monitoring device from the handheld device.

12. The system of claim 11, wherein the handheld device is configured to receive inspection data for the motorized asset from the asset monitoring device.

13. The system of claim 12, wherein the handheld device is connected to a scanning device for scanning one or more portions of the motorized asset.

14. The system of claim 1, wherein the asset monitoring device is configured to log the asset data intermittently when a predetermined logging trigger is met.

15. The system of claim 1, wherein the asset monitoring device generates data about the motorized asset using at least one of signals received through a communication bus of the motorized asset and signals received from a GPS module of the motorized asset, and wherein the asset data comprises the data generated by the asset monitoring device.

16. The system of claim 1, wherein the fueling data comprises signals received by the fuel control device from at least one of a sensor of the mobile fuel source and a switch of the mobile fuel source.

17. The system of claim 1, wherein the mobile fuel source is connected to a GPS module, and wherein the fueling data comprises signals received by the mobile fuel source from the GPS module.

18. The system of claim 1, wherein the mobile fuel source is connected to a human machine interface, and wherein the fueling data comprises signals received by the fuel control device from the human machine interface.

19. The system of claim 1, wherein the control logic of the asset monitoring device tracks the idle time of an engine of the motorized asset.

20. The system of claim 19, wherein the control logic compares the RPM of the engine against a predetermined threshold RPM to track the idle time of the motorized asset.

21. The system of claim 20, wherein the asset monitoring device sends a signal to an indicator when the engine has been idling for a predetermined maximum idle time.

22. The system of claim 1, wherein the asset monitoring device notifies the mobile fuel source that the motorized asset does not require fuel.

23. The system of claim 22, wherein the asset monitoring device sends a signal to turn on a visible indicator to notify an operator of the mobile fuel source that the motorized asset does not require fuel.

24. The system of claim 1, wherein the fuel control device determines whether a user is authorized to operate the mobile fuel source.

25. The system of claim 24 further comprising a human machine interface connected to the fuel control device to collect identification data about the user, and wherein the fuel control device compares the identification data against a list of authorized users to determine whether the user is authorized to operate the mobile fuel source.

26. The system of claim 1, wherein the fuel control device determines the identity of the motorized asset to be fueled using the mobile fuel source.

27. The system of claim 26, wherein the fuel control device determines the identity of the motorized asset from the asset data received from the asset monitoring device.

28. The system of claim 1, wherein the fuel control device uses the asset data to determine the amount and type of fuel permitted for the motorized asset.

29. The system of claim 1, wherein an operator of the motorized asset pushes a button that sends a signal to the asset monitoring device to transmit the asset data to the fuel control device.

30. The system of claim 1, wherein the asset monitoring device compares the asset data against shut down data managed on the central server and transmitted to the asset monitoring device to determine a length of time the motorized asset is permitted to idle after an ignition of the motorized asset is turned off.

31. A system for monitoring a motorized construction asset, comprising;
at least one asset monitoring device configured for use with the motorized construction asset that is powered by a liquid or gaseous fuel, the asset monitoring device comprising a controller having control logic and a memory, wherein the asset monitoring device is configured to collect asset data about the motorized construction asset;
at least one fuel control device configured for use with a mobile fuel source for the motorized construction asset, the mobile fuel source is separate from the motorized construction asset and capable of being used for more than one motorized construction asset and fuel provided by the mobile fuel source is the liquid or gaseous fuel used to power the motorized construction asset, the fuel control device comprising a controller having control logic and a memory, wherein the fuel control device is configured to control the fuel provided to the motorized construction asset from the mobile fuel source, and wherein the fuel control device is configured to collect fueling data about fueling of the motorized construction asset and communicate with the asset monitoring device to receive the asset data from the asset monitoring device; and
a central server configured to communicate with the fuel control device to receive the asset data and the fueling data from the fuel control device, wherein the fuel control device is configured to transmit the asset data and the fueling data to the central server;
wherein the fuel control device of the mobile fuel source broadcasts a sync frame at a specified radio frequency and the asset monitoring device of the motorized construction asset scans radio frequencies listening for the sync frame from the fuel control device and determines from the signal strength of the sync frame whether the mobile fuel source is within a specified range of the motorized construction asset, and wherein, when the mobile fuel source is within the specified range of the motorized construction asset, the asset monitoring device begins to transmit the asset data to the fuel control device, determines whether the motorized construction asset has been run for more than a predetermined length of time since the motorized construction asset was last fueled, and notifies the mobile fuel source whether the motorized construction asset needs fuel.

32. The system of claim 31, wherein the fuel control device controls the amount of fuel provided to the motorized construction asset from the mobile fuel source.

33. The system of claim 31, wherein the fuel control device controls the type of fuel provided to the motorized construction asset from the mobile fuel source.

34. The system of claim 31, wherein the asset monitoring device determines whether a user is authorized to operate the motorized construction asset.

35. The system of claim 34 further comprising a human machine interface connected to the asset monitoring device that collects identification data about the user, and wherein the asset monitoring device compares the identification data against a list of authorized users to determine whether the user is authorized to operate the motorized construction asset, and wherein the asset monitoring device enables an ignition for the motorized construction asset if the user is authorized to operate the motorized construction asset.

36. The system of claim 31, wherein the asset monitoring device determines whether an inspection of the motorized construction asset was completed and enables ignition for the motorized construction asset if the inspection was completed.

37. The system of claim 36 further comprising a handheld device configured to communicate with the asset monitoring device, wherein the handheld device transmits the results of the asset inspection to the asset monitoring device.

38. The system of claim 37, wherein the asset monitoring device determines whether the inspection was completed by comparing the results of the inspection against an inspection checklist.

39. The system of claim 31, wherein the mobile fuel source is a fuel truck.

40. The system of claim 39, wherein the fuel control device is configured to receive central data from the central server and transmit the central data to the asset monitoring device, and wherein the asset monitoring device is configured to receive the central data from the fuel control device, and wherein, when the fuel truck is within the specified range of the motorized construction asset, the fuel control device begins to transmit the central data to the asset monitoring device.

41. The system of claim 35, wherein the list of authorized users is generated from information that includes the level of ability, level of training, certification, and hours worked for each user.

42. The system of claim 39 further comprising a fuel truck human machine interface connected to the fuel control device that collects fuel truck identification data about a user of the fuel truck, and wherein the central data includes fuel truck operator data that is managed on the central server, and wherein the fuel control device compares the fuel truck identification data against the fuel truck operator data to determine whether the user is authorized to operate the fuel truck, and wherein the fuel control device permits the user access to the fuel control device if the user is authorized to operate the fuel truck, and wherein the fuel truck operator data includes a list of authorized fuel truck operators generated from information that includes the level of ability, level of training, certification, and hours worked for each operator.

* * * * *